United States Patent
Feaver et al.

(10) Patent No.: US 12,516,986 B2
(45) Date of Patent: Jan. 6, 2026

(54) MULTIPLE CHARACTERISTIC OPTICAL SENSOR

(71) Applicant: Photon Control Inc., Richmond (CA)

(72) Inventors: Michael Feaver, Richmond (CA); Richard Hawley, Richmond (CA); Michael Tischler, Richmond (CA); Bram Sadlik, Richmond (CA); Hamed Akbari, Richmond (CA)

(73) Assignee: Photon Control Inc., Richmond (CA)

( * ) Notice: Subject to any disclaimer, the term of this patent is extended or adjusted under 35 U.S.C. 154(b) by 409 days.

(21) Appl. No.: 18/341,395

(22) Filed: Jun. 26, 2023

(65) Prior Publication Data
US 2024/0426668 A1 Dec. 26, 2024

(51) Int. Cl.
| | |
|---|---|
| *G01J 5/0821* | (2022.01) |
| *G01J 5/02* | (2022.01) |
| *G01J 5/04* | (2006.01) |
| *G01J 5/08* | (2022.01) |
| *G01J 5/53* | (2022.01) |
| *G01N 21/64* | (2006.01) |

(52) U.S. Cl.
CPC ............ *G01J 5/0821* (2013.01); *G01J 5/027* (2013.01); *G01J 5/046* (2013.01); *G01J 5/0896* (2013.01); *G01J 5/53* (2022.01); *G01N 21/6408* (2013.01)

(58) Field of Classification Search
CPC ........ G01J 5/0821; G01J 5/0896; G01J 5/046; G01J 5/027; G01J 5/53; G01N 21/6404
See application file for complete search history.

(56) References Cited

U.S. PATENT DOCUMENTS

| | | | | |
|---|---|---|---|---|
| 5,112,137 A | * | 5/1992 | Wickersheim | G01J 5/0846 374/161 |
| 5,183,338 A | * | 2/1993 | Wickersheim | G01J 5/0846 374/161 |
| 2008/0225926 A1 | | 9/2008 | Gotthold et al. | |

OTHER PUBLICATIONS

Allison, S.W.; Gillies, G.T. Remote thermometry with thermographic phosphors: Instrumentation and applications. Rev. Sci. Instrum. Jul. 1, 1997; 68 (7): 2615-2650.
(Continued)

*Primary Examiner* — Randy W Gibson
(74) *Attorney, Agent, or Firm* — Edward Scott Trask

(57) ABSTRACT

The present application discloses embodiments of a temperature sensor system that uses multiple characteristics of optical radiation signals to determine a temperature of an object. The temperature sensor system includes a light source configured to emit an optical excitation signal propagating to a temperature probe having a phosphor sensing element that emits an optical excitation response signal having a characteristic of phosphorescent radiation proportional to the temperature of the object. The temperature probe emits an optical-excitation-independent signal having a characteristic of black-body radiation emitted by components of the temperature probe. The optical excitation response signal and the optical-excitation-independent signal form a combined signal propagating to a detector that provides a signal representative of the combined signal to a controller configured to separate the signal representative of the combined signal into signals representative of the optical excitation response signal and the optical-excitation-independent signal and calculate the temperature of the object.

53 Claims, 11 Drawing Sheets

(56) References Cited

OTHER PUBLICATIONS

Khalid, A.H.; Kontis, K. Thermographic phosphors for high temperature measurements: principles, current state of the art and recent applications. Sensors. Sep. 15, 2008; 8(9):5673-5744.
Pinet, Éric et al. Temperature fiber-optic point sensors: Commercial technologies and industrial applications. Informacije MIDEM. Dec. 1, 2010; 40.
Allison, S.W. A brief history of phosphor thermometry. Measurement Science and Technology. May 31, 2019;30 (7):072001.
International Search Report issued for PCT counterpart application No. PCT/CA2024/050751 dated Aug. 20, 2024 (3 pages).
Written Opinion issued for PCT counterpart application No. PCT/CA2024/050751 dated Aug. 20, 2024 (5 pages).

\* cited by examiner

MULTIPLE CHARACTERISTIC OPTICAL SENSOR

BACKGROUND

Optical sensors, specifically fiber optic sensors, are used for a variety of applications in semiconductor manufacturing, including the measurement of temperature, strain, and position of wafers, electrostatic chucks, showerheads, and other components in the harsh chemical and radio-frequency environment inside and around wafer processing chambers, other radio-frequency energy-rich environments, nuclear magnetic resonance imaging, and the like. Optical sensors have the advantage that they can be immune to radio-frequency energy and high magnetic fields. Another advantage is the opportunity to physically separate the sensing element from the rest of the temperature measurement system, for example, to allow characterization of very high temperature objects or moving/rotating objects, such as turbine blades or to reduce the impact, for example thermal impact, of the measurement system on the object or system to be measured.

One type of optical temperature sensor system relies on thermographic phosphor temperature sensors that measure one or more temperature-dependent characteristics of the phosphor or emission from the phosphor to determine a temperature, for example, the temperature-dependent variation of the time decay constant (also referred to herein as "time constant") of phosphorescent emission, or the temperature-dependent intensity variation or other temperature-dependent parameters to determine a temperature. These thermographic sensor systems typically use an optical pump such as a LED or laser or other optical source to excite a phosphor sensing element and measure the resulting phosphorescent emission with a photodetector. An optical path (e.g., an optical fiber or waveguide) optically connects the optical pump and photodetector to the phosphor, which is placed in thermal communication with a target surface, object, or is immersed or located at a measurement location where a temperature measurement is desired. The resulting phosphorescent emission is coupled back into the waveguide where it is guided to the photodetector.

While prior art thermographic phosphor temperature sensors and sensor systems have proven useful in the past, a number of shortcomings have been identified. For example, black-body radiation emitted from surfaces of components of these sensors may be coupled into the optical waveguide along with the phosphorescent radiation signal, interfering or otherwise affecting the phosphorescent radiation signal or the measured signal or results. What is needed is a measurement system that can discern between phosphorescent radiation and black-body radiation, and that can use the two signals to make accurate temperature measurements over wider temperature ranges, particularly at temperatures where the black-body radiation signal is significant compared to the phosphorescent radiation signal.

SUMMARY

The present application discloses various embodiments of a temperature sensor system that uses multiple characteristics of optical radiation signals to determine a temperature of an object. In one embodiment, the temperature sensor system comprises at least one light source configured to emit at least one optical excitation signal, at least one temperature sensing device including at least one sensing element in thermal communication with at least one object to be measured, wherein the sensing element is configured to emit at least one optical excitation response signal and the temperature sensing device is configured to emit at least one first combined signal comprising at least a portion of the optical excitation response signal and at least one optical-excitation-independent signal. The temperature sensor system further includes at least one first detector configured to receive at least a portion of the first combined signal, and at least one optical path configured to allow the optical excitation signal to propagate to the sensing element and to allow at least a portion of the first combined signal to propagate from the temperature sensing device to the first detector. At least one controller is provided, wherein the first detector is configured to provide at least one signal representative of the first combined signal to the controller, and the controller is configured to separate the signal representative of the first combined signal into at least one signal representative of the optical excitation response signal and at least one signal representative of the optical-excitation-independent signal. The controller is configured to calculate an object temperature based on at least one of the signal representative of the optical excitation response signal and the signal representative of the optical-excitation-independent signal. The signal representative of the optical-excitation-independent signal comprises at least one first characteristic of the signal representative of the optical-excitation-independent signal, and the signal representative of the optical excitation response signal comprises at least one second characteristic of the signal representative of the optical excitation response signal. In various embodiments, at least one of the first characteristic or the second characteristic comprises at least one of an intensity or amplitude, a change in intensity or amplitude over a time period, an intensity decay rate, an optical power spectrum, or one or more portions of an optical power spectrum. The controller is configured to calculate an object temperature based on at least one of the first characteristic of the signal representative of the optical-excitation-independent signal and the second characteristic of the signal representative of the optical excitation response signal. In various embodiments, the first characteristic of the signal representative of the optical-excitation-independent signal may comprise an intensity of black-body radiation or an intensity of at least one wavelength of black-body radiation. In various embodiments, the second characteristic of the signal representative of the optical excitation response signal may comprise an intensity decay rate of the optical excitation response signal or an intensity of at least one wavelength of the optical excitation response signal. In some embodiments, the temperature sensor system further comprises a temperature transition range, wherein the controller is configured to use the optical excitation response signal to determine the object temperature when the object temperature is below the temperature transition range and to use the optical-excitation-independent signal to determine the object temperature when the object temperature is above the temperature transition range. The object temperature from the optical-excitation-independent signal may be used to determine if the object temperature is above or below the temperature transition range. In some embodiments, the controller is configured to use the optical excitation response signal to determine the object temperature when the object temperature is less than the minimum of the temperature transition range, and to use the optical-excitation-independent signal to determine the object temperature when the object temperature is greater than the maximum of the temperature transition range, and to use a combination of the optical excitation response signal and the optical-excitationindependent signal when the object temperature is within the temperature transition range. In various embodiments, the temperature probe may includes one or more portions of a surface having an emissivity less than about 0.70 or about 0.30. The optical path may be provided as an optical fiber or an optical fiber bundle having a first end and a second end, wherein the second end is spaced apart from the sensing element by less than 5 mm. In various embodiments, the sensing element comprises at least one thermographic phosphor selected from the group consisting of $La_2O_2S:Eu$, $Y_2O_3:Eu$, $LuPO_4:Eu$, $Mg_4FGeO_6:Mn$, $YVO_4:Dy$, $Y_2O_3:Dy$, $Y_3Al_5O_{12}:Dy$, $LuPO_4:Dy$, $YAG:Dy$, $GdAlO_3:Cr$, $Al_2O_3:Cr$, $LaGaO_3:Cr$, $YalOs:Cr$ or any stoichiometries or combinations of the foregoing. In various embodiments, the first optical excitation response signal is characterized by an optical bandwidth having an upper wavelength and a lower wavelength. The temperature sensor system may further comprise at least a first short-pass filter configured to have a cut-off wavelength within 10% of the upper wavelength of the optical bandwidth of the optical excitation response signal. In some embodiments, the temperature sensor system may further comprise at least one second detector configured to receive at least a portion of the first combined signal, and the optical path is configured to allow a first portion of the combined signal to propagate to the first detector and to allow a second portion of the combined signal to propagate to the second detector, wherein at least a portion of the first portion of the combined signal comprises the optical excitation response signal and at least a portion of the second portion of the combined signal comprises the optical-excitation-independent signal. The first detector may be configured to receive the optical excitation response signal and the second detector may be configured to receive the optical-excitation-independent signal. In various embodiments, the first detector and the second detector may comprise at least one photodiode, at least one monochromator, or at least one Czerny-Turner monochromator.

In other embodiments, the temperature sensor system comprises at least one light source configured to emit at least one optical excitation signal, at least one temperature sensing device including at least one sensing element in thermal communication with at least one object to be measured, wherein the sensing element is configured to emit at least one optical excitation response signal and the temperature sensing device is configured to emit at least one first combined signal comprising at least a portion of the optical excitation response signal and at least one optical-excitation-independent signal, wherein the optical analysis module is configured to receive at least a portion of the first combined signal. The temperature sensing system may further comprise at least one optical path configured to allow the optical excitation signal to propagate to the sensing element and to allow at least a portion of the first combined signal to propagate from the temperature sensing device to the optical analysis module. The optical analysis module is configured to receive the combined signal from the temperature sensing device, and to separate the combined signal into a plurality of discrete wavelength components propagating to at least one measurement module comprising a plurality of detectors, wherein each of the plurality of detectors correspond to each of the plurality of discrete wavelength components and are configured to provide at least one signal representative of the each of the plurality of discrete wavelength components to the controller, wherein the controller is configured to separate the signal representative of each of the plurality of discrete wavelength components into at least one signal representative of the optical excitation response signal and at least one signal representative of the optical-excitation-independent signal. In various embodiments, the characteristic of the optical excitation response signal comprises an intensity decay rate or an intensity of at least one wavelength of the optical excitation response signal. In various embodiments, the characteristic of the optical-excitation-independent signal comprises an intensity of black-body radiation or an intensity of at least one wavelength of black-body radiation. The controller may be configured to calculate at least one object temperature based on at least one of the characteristics of the optical excitation response signal and at least one of the characteristic of the optical-excitation-independent signal. The light source may comprise a light-emitting diode or a laser, either one of which emits radiation within a wavelength range of about 375 nm to about 800 nm.

In other embodiments, the temperature sensor system includes a light source configured to emit at least one optical excitation signal, and at least one temperature sensing device having at least one sensing element in thermal communication with an object to be measured, wherein the sensing element is configured to emit at least one optical excitation response signal. The temperature sensing device may be configured to emit at least one first combined signal comprising at least a portion of the optical excitation response signal and at least one optical-excitation-independent signal. The temperature sensor system further includes at least one first detector configured to receive at least a portion of the first combined signal, and at least one optical path configured to allow the optical excitation signal to propagate to the sensing element and to allow at least a portion of the first combined signal to propagate from the temperature sensing device to the first detector. The temperature sensor system is configured to determine at least one signal representative of the optical-excitation-independent signal at a first time, determine at least one signal representative of the optical excitation response signal at a second time that is different from the first time, and calculate an object temperature based on at least one of the signal representative of the optical-excitation-independent signal determined at the first time and the signal representative of the optical excitation response signal determined at the second time. The signal representative of the optical-excitation-independent signal at the first time may comprise at least one first characteristic of the signal representative of the optical-excitation-independent signal at the first time, wherein the signal representative of the optical excitation response signal at the second time comprises at least one second characteristic of the signal representative of the optical excitation response signal at the second time. In various embodiments, the first characteristic or the second characteristic comprise an intensity or amplitude, a change in intensity or amplitude over a time period, an intensity decay rate, an optical power spectrum, or one or more portions of an optical power spectrum. The controller is configured to calculate an object temperature based on at least one first characteristic of the signal representative of the optical-excitation-independent signal at the first time and at least one second characteristic of the signal representative of the optical excitation response signal at the second time. In various embodiments, the first characteristic of the signal representative of the optical-excitation-independent signal at the first time may comprise an intensity of black-body radiation or an intensity of at least one wavelength of black-body radiation. The second characteristic of the signal representative of the optical excitation response signal at the second time may comprise an intensity decay rate of the optical excitation response signal or an intensity of at one wavelength of the optical excitation response signal. The temperature sensor system may further comprise a first temperature measuring device configured to measure a temperature of the detector, wherein the temperature of the detector is at least in part used to determine the dark current of the detector, and the object temperature is at least in part determined by correcting for the dark current of the detector. The temperature sensor system may further comprise a temperature transition range, wherein the controller is configured to use the optical excitation response signal at a second time to determine an object temperature when the object temperature is below the temperature transition range, and to use the optical-excitation-independent signal at a first time to determine the object temperature when the object temperature is above the temperature transition range. The object temperature determined from the optical-excitation-independent signal at the first time may be used to determine if the object temperature is above or below the temperature transition range. In other embodiments, temperature sensor system may further comprise a temperature transition range having a minimum value and a maximum value, wherein the controller is configured to use the optical excitation response signal at a second time to determine an object temperature when the object temperature is less than the minimum value of the temperature transition range. The controller may use the optical-excitation-independent signal at a first time to determine the object temperature when the object temperature is greater than the maximum value of the temperature transition range, and use a combination of the optical excitation response signal at a first time and the optical-excitation-independent signal at a second time when the object temperature is within the temperature transition range.

In other embodiments, the present application includes a method of measuring an object temperature, comprising providing at least one temperature sensing device having at least one sensing element in thermal communication with an object to be measured, wherein the sensing element configured to emit at least one optical excitation response signal and the temperature sensing device is configured to emit at least one combined signal comprising at least one a portion of the optical excitation response signal and at least one optical-excitation-independent signal. At least one light source is provided, wherein the light source is configured to emit at least one optical excitation signal. At least one optical path may be provided, wherein the optical path is configured to allow the optical excitation response signal to propagate to the sensing element. At least one detector may be provided, wherein the detector is configured to receive the optical excitation response signal and the combined signal from the temperature sensing device and to provide at least one signal representative of the combined signal to at least one controller. The controller is configured to separate the signal representative of the first combined signal into at least one signal representative of the optical excitation response signal and at least one signal representative of the optical-excitation-independent signal. In an excitation step, the light source module emits and directs the optical excitation signal to the temperature sensing device. In a decay sampling step, the detector is sampled during at least one decay sampling period, and data representative of the intensity decay rate associated with the combined signal is stored. In a system measurement step, the temperature of the detector is measured, followed by calculation of a parameter relating to the dark current of the detector. In a black-body radiation measurement step, the detector is sampled and data representative of the optical-excitation-independent signal is stored. In a signal processing step, the controller calculates at least one object temperature based on at least one of the signal representative of the optical excitation response signal and the signal representative of the optical-excitation-independent signal. The method further comprises subtracting the parameter relating to the dark current of the detector from the parameter representative of the optical-excitation-independent signal to product a dark-current-corrected black-body signal. The dark-current-corrected black-body signal is compared to known data of the optical-excitation-independent signal, and the calculating an object temperature associated with the optical-excitation-independent signal is calculated. The method further comprises subtracting the dark-current-corrected black-body signal and the optical-excitation-independent signal from the combined signal to create data representative of the optical excitation response signal, then calculating at least one time constant of the optical excitation response signal based on the intensity decay rate of the combined signal, Finally, an object temperature associated with the time constant of the optical excitation response signal is calculated.

BRIEF DESCRIPTION OF THE DRAWINGS

Various embodiments of an improved temperature measurement system will be explained in more detail by way of the accompanying drawings, wherein.

DETAILED DESCRIPTION

Figure 1:
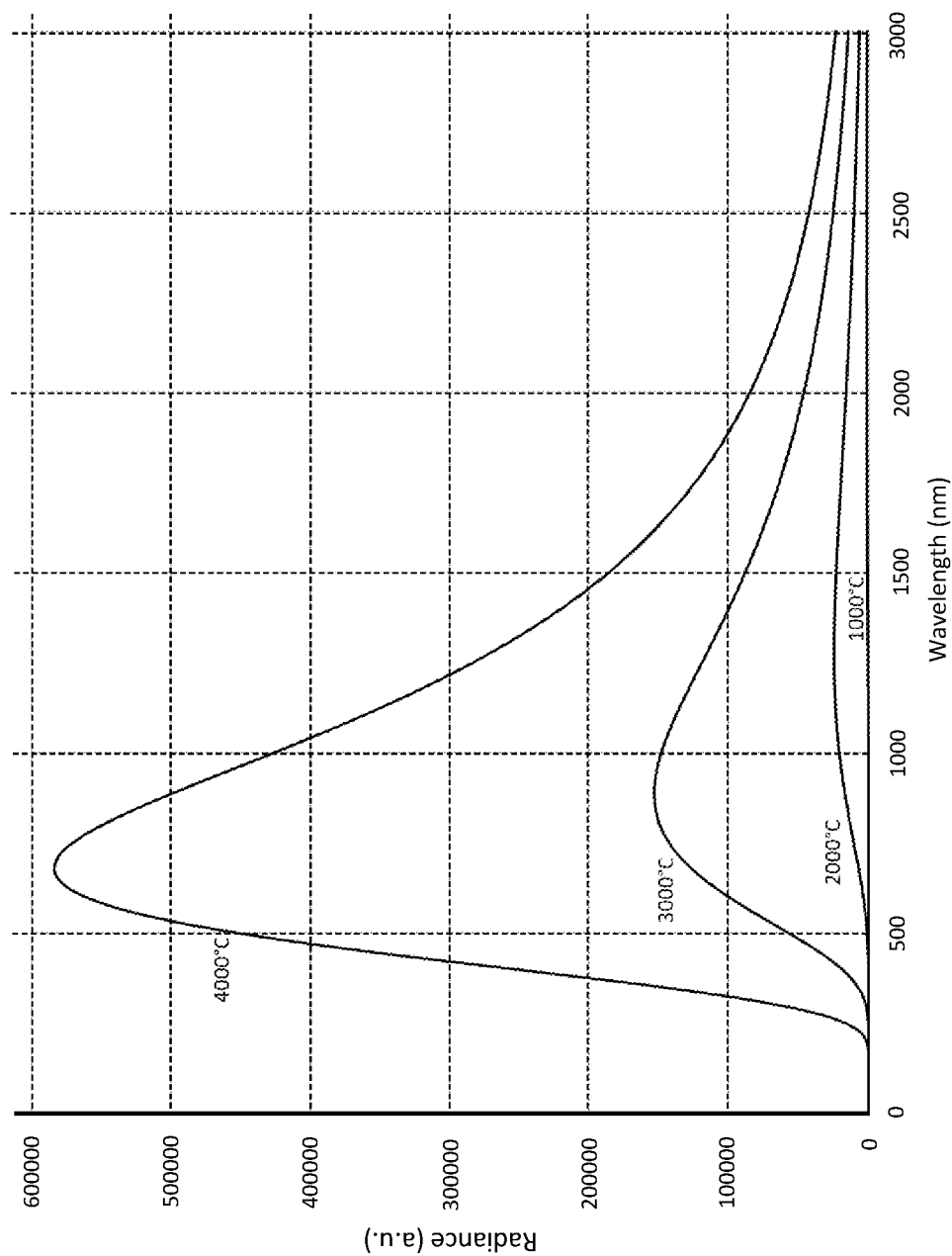
FIG. 1 shows a graph of the optical power spectrum of black-body radiation as a function of temperature, according to Planck's law.

Example embodiments are described herein with reference to the accompanying drawings. Unless otherwise expressly stated, in the drawings the sizes, positions, etc., of components, features, elements, etc., as well as any distances therebetween, are not necessarily to scale, and may be exaggerated for clarity. Likewise, values and durations shown in graphical figures, (such as graphs of signal intensity over time), are not necessarily to scale. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular exemplary embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. Also, the terms "at least one", "at least a", and "one or more" may are intended to include both the singular and plural forms, depending on the context. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless indicated otherwise, terms such as "first," "second," etc., are only used to distinguish one element from another. For example, one coupler could be termed a "first coupler" and similarly, another coupler could be termed a "second coupler", or vice versa.

Unless indicated otherwise, spatially relative terms, such as "below," "beneath," "lower," "above," and "upper," "opposing," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly. A set of reference axes (e.g., X, Y, Z), directions, or coordinates, and the rotation around them (e.g., θX, θY, θZ) may be included in the FIGS. for the purpose of orienting the reader to facilitate understanding of the FIGS. and the specification, and do not necessarily indicate that any particular feature or element is aligned with, or is orthogonal to, any other feature or element.

The paragraph numbers used herein are for organizational purposes only, and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

FIG. 1 shows a graph of the optical power spectrum (also referred to herein as the "spectral radiance spectrum") of black-body radiation as a function of temperature, according to Planck's law. As temperature increases, the intensity of black-body radiation increases and the peak of its optical power spectrum shifts to shorter wavelengths. For example, as shown in FIG. 1, a black body at 3,000° C. has a radiance of about 15,000 (in arbitrary units) at 1,000 nm, but has a radiance of about 5,000 at about 500 nm. As is known, black-body radiation is thermal electromagnetic radiation emitted by a black body (an idealized opaque, non-reflective body). Black-body radiation has a continuous spectrum of wavelengths distributed according to Planck's law, with a total radiant power or intensity that depends mainly on the black body's temperature according to the Stefan-Boltzmann law. For example, a black body at room temperature (about 23° C.) radiates mostly in the infrared ranges of the electromagnetic spectrum. As the temperature of the black body increases, for example, to about 600° C., the magnitude of the emission increases, and the emission spectrum extends into the human visual range, and the black body appears red. As temperature of the black body increases further, the black body emits orange, yellow, green, blue, and violet light (and, ultimately beyond violet into the ultraviolet). A black body is an idealized concept, but the concept still applies to ordinary objects, because they also emit black-body radiation with a radiance proportional to the fourth power of their temperature and with a spectrum described by Planck's law. In cases where the object is not a perfect black body, the spectrum of radiation emitted from the object's surface also depends on the emissivity of that surface.

To sense black-body radiation emitted from a surface at a temperature, the optics that transmit black-body radiation to a detector must be capable of transmitting at least a portion of the wavelength range emitted at that temperature and a detector must be sensitive to at least a portion of the black-body radiation wavelength range that is also transmitted by the optics. To measure black-body radiation emitted from a surface at a temperature below about 25° C., for example, where black-body radiation is primarily in the mid-infrared portion of the electromagnetic spectrum, optics having high transmittance in that wavelength range, such as Zinc Sulfide (ZnS), Germanium (Ge) optics, or hollow waveguides are typically used to transmit the black-body radiation, and thermopiles are typically used to detect the black-body radiation. The transmittance of ZnS and Ge is much higher than silica or quartz at these mid-IR wavelengths and thermopiles may be used for measuring radiation at wavelengths greater than 2,600 nm. To measure black-body radiation emitted from a surface at a temperature above about 25° C., for example, silica optics (or glass optics) and InGaAs photodiodes are also capable of transmitting and detecting, respectively, black-body radiation and may be used in place of or in addition to mid-IR optics and thermopile detectors. To measure black-body radiation emitted from a surface at a temperature above about 200° C., for example, silicon photodiodes are also capable of detecting black-body radiation and may be used in place of or in addition to thermopile detectors or InGaAs detectors. To measure black-body radiation emitted from a surface at a temperature above about 400° C., for example, plastic optical fibers are also capable of transmitting visible and near-infrared black-body radiation and may be used in place of or in addition to ZnS optics, Ge optics, hollow light guides, silica fibers or glass fibers.

The embodiments described herein relate to the equipment and methods used to measure the temperature of objects, surfaces, volumes, or areas by measuring the electromagnetic radiation emitted by from these objects. The measured temperature of these objects, surfaces, volumes, or areas may also be referred to herein as the "object temperature". In some embodiments, these objects, surfaces, volumes, or areas whose temperature may be measured are related to equipment used in semiconductor manufacturing, such as silicon wafers, electrostatic chucks, pedestals, edge rings, showerheads, valves, piping, vacuum chamber components, and the like, however this approach may be used for other applications without limit. The emitted radiation may include phosphorescent radiation (e.g., emitted, for example, by a phosphor sensing element having been excited by an excitation signal). The emitted radiation may also include black-body radiation (e.g., emitted by the object or sensing element during or after the phosphorescent radiation from the phosphor sensing element has decayed or when it may not be present). In addition, black-body radiation may also be emitted by components of temperature probes themselves (e.g., the housing, ferrule, sensing tip, etc.). At temperatures above about 600° C., the intensity of black-body radiation may become an increasing percentage of the total radiation received by a temperature sensing system, however, as described herein, the temperature where black-body radiation becomes significant to the measurement is a function of multiple parameters of the system.

The Detailed Description below relates to various embodiments of novel temperature sensors, sensor systems, and measurement methods. In various embodiments, these improved sensor systems are capable of improved accuracy across a wider temperature range by utilizing a characteristic of a radiation signal that varies as a result of optical excitation, and also utilizing a characteristic of a radiation signal that does not vary as a result of optical excitation. In some embodiments, both signals may be used simultaneously, while in other embodiments each signal may be used at different times.

In various embodiments, these improved sensors, sensor systems, and measurement methods are capable of measuring temperature over a wider range of temperatures and/or with a higher accuracy, by detecting both luminescent signals (that are emitted in response to an optical excitation signal) and black-body signals (that are emitted independent of any optical excitation signal), and then separating and analyzing these signals using a variety of equipment and methods. In addition, these novel sensor systems may utilize much of the same optical and optoelectronic hardware (e.g., light sources, detectors, optics (fibers, filters, gratings, lenses, mirrors, etc.)) for the detection and processing of both types of signals. Also, the use of two or more separate temperature-dependent signals may allow for reducing the impact of variations of the optical path, such as time-varying changes in attenuation or spectral variation through the optical path, due to characteristics of components comprising the optical path. The use of two different signals may also allow for pre-determination of the effect on attenuation of each signal.

For example, at a temperature where both the luminescent and black-body signals have relatively the same measured intensity, the temperature calculated from the luminescent signal and the optical power of the black-body signal may be used to calculate a parameter that can be stored and used to improve the accuracy of the black-body temperature calculation at other temperatures. This parameter may characterize the emissivity of surfaces, or the transmission spectrum of the optical path, or both. The emissivity of the surface has a linear relationship with the black-body power measured and so can influence the temperature measured from the black-body signal. By characterizing the emissivity using the temperature calculated from the luminescent signal, the variation in emissivity can be corrected and this correction factor may be applied across a wider temperature range. Similarly, an increase in the length of the optical path (or a change in materials used in the optical path) may change the black-body radiation power transmitted along the optical path, leading to an error in the measured temperature.

The combined effects of emissivity and change in optical path attenuation may be estimated by applying the temperature calculated from the luminescence signal and the power of the black-body signal to calculate a new coefficient or other parameter that may be used to correct for these effects in the temperature calculated from the black-body signal. A formula derived from the Stefan-Boltzmann law:

$$P = A\varepsilon\sigma cT^4$$

where P is the power of the full spectrum of black-body radiation, A is area of the surface, $\varepsilon$ is emissivity of the surface, $\sigma$ is the Stefan-Boltzmann constant, c is a constant factor related to optical path geometry and attenuation and other factors of the sensor system, and T is temperature, describes an ideal relationship between the power of the black-body radiation and temperature. A photodiode will sense only a fraction of the full spectrum of black-body radiation and this fraction will vary with the temperature of the black body, so the relationship between power measured using a photodiode and the temperature may be characterized differently, for example by using a similar formula with a shifted temperature parameter, a polynomial, a lookup table or a combination of the above. For example, the following formula approximates the relationship between the power measured by a silicon photodiode and the black-body temperature:

$$P = k(T - T_0)^4$$

where k is a parameter that describes a combination of factors including emissivity and optical path geometry and attenuation and $T_0$ is an additional parameter.

At a temperature T where the power from the black-body signal P is sufficiently low to permit accurate temperature measurement from both the luminescence signal and the black-body signal, for example between about 500° C. and about 650° C. in an exemplary embodiment, the parameter k may be calculated and stored. This parameter k may then be applied to calculate an emissivity-corrected or attenuation-corrected black-body temperature at in this range of temperatures and at other temperatures, for example at higher temperatures, for example in the exemplary embodiment, between about 650° C. and about 900° C., according to a formula:

$$T = T_0 + (P/k)^{1/4}$$

Further refinement of this parameter k may be possible by determining its value at several different temperatures. The value or values of this parameter k may be calculated at different times, for example, at the time of manufacture of the temperature measurement system, or supplied as a known parameter of a given configuration or calculated while the temperature sensor is in use. Further refinements of the relationship between measured black-body power and black-body temperature that enable characterization of the optical path and emissivity and other factors may be possible, including using polynomial approximations, lookup tables or both.

This approach describes a method of calibrating a radiometric temperature sensor, for example automatically or manually, by characterizing the emissivity, optical path geometry, and optical path attenuation of a radiometric temperature sensor using an independent temperature reference, in this case using the temperature calculated from luminescence decay. This method overcomes the emissivity and optical path dependence that prior art radiometric temperature sensors typically possess. Similarly, in other embodiments, characteristics of optical response signals may be parameterized using characteristics of optical-excitation-independent signals (or vice versa) to reduce uncertainty in resulting temperature measurements.

The present disclosure uses a variety of terms related to optical radiation and optical signals sent to or received from various elements, components, systems, or sub-systems. These signals are broken down into six groups. First, optical radiation operative to excite certain atomic species or to excite a response of a sensing element (e.g., a thermographic phosphor) will be referred to herein as "excitation" radiation or signals. Second, optical radiation operative to reflect from, be partially absorbed by, or transmitted by a sensing element (e.g., a band-gap-type sensing element) will be referred to herein as "illumination" radiation or signals. Third, optical radiation or signals emitted by a sensing element in response to excitation radiation will be referred to herein as "luminescent", "phosphorescent", or "optical excitation response" radiation or signals. Fourth, optical radiation or signals that are not due to excitation or illumination radiation will be referred to as "black-body" or "optical-excitation-independent" radiation or signals. Fifth, optical radiation or signals reflected from a sensing element that receives "illumination" radiation will be referred to as "reflected" radiation or signals. Sensors may also be designed to transmit instead of reflect light, and, for such sensors, a transmitted radiation or signal may be construed in place of the reflected radiation or signal terminology. Finally, optical radiation or signals received by the detectors of the sensing systems or instruments described herein that include (or may include) more than one of the aforementioned "luminescent", "phosphorescent", "optical excitation response", "black-body", "optical-excitation-independent" or "reflected" radiation or signals will be referred to as "combined" radiation or signals.

Figure 2:
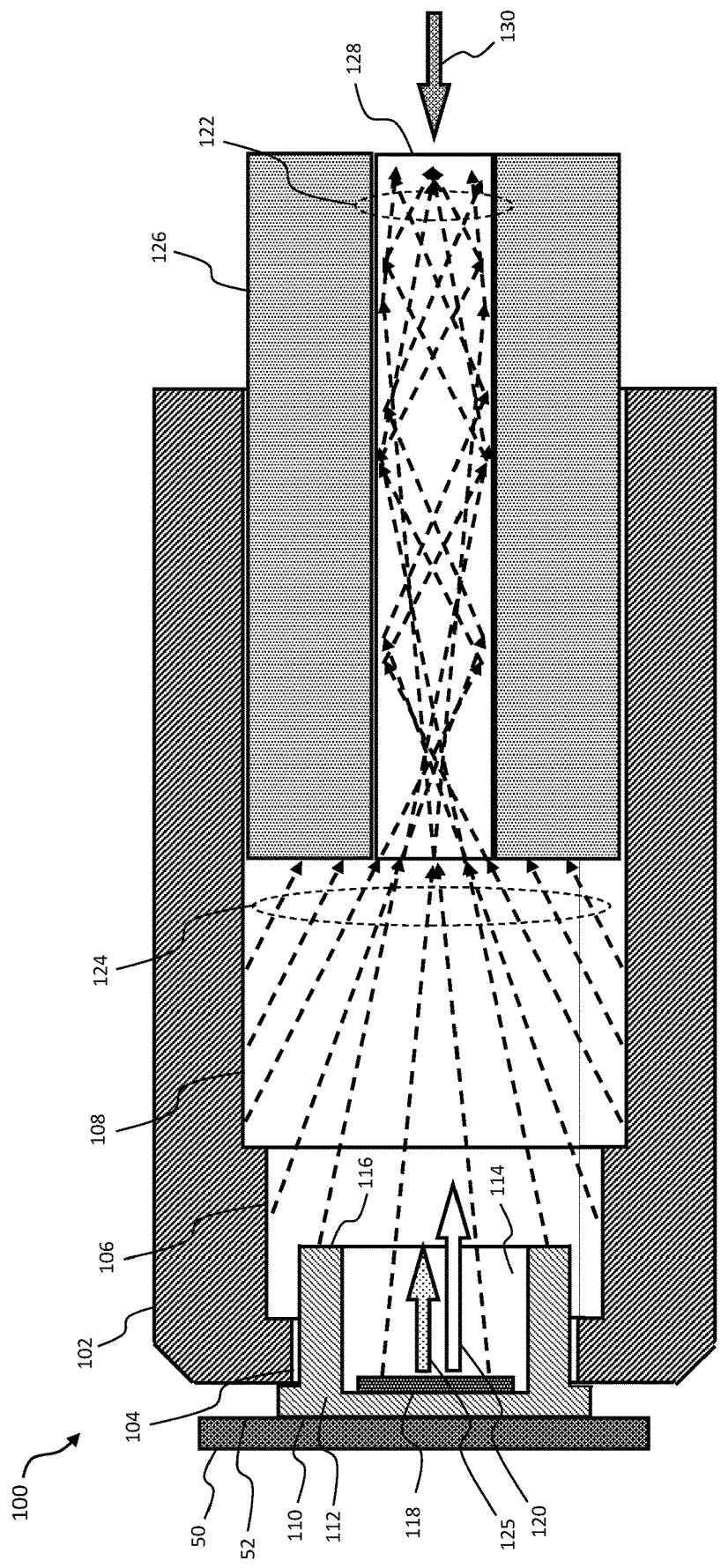
FIG. 2 shows a schematic cross-section view of an embodiment of a portion of a fiber-optic temperature probe for measuring an object temperature using a thermographic phosphor and/or black-body radiation.

FIG. 2 shows a cross-section view of a portion of an exemplary temperature sensing device 100 (also referred to herein as "fiber optic temperature probe 100", "temperature probe 100" or "probe 100") operative to measure the temperature of a surface 52 of a target 50 or other object to be measured. The measured object temperature is defined as the temperature or the temperature reading (calculated temperature) of the object, surface, volume or area that the temperature probe and the sensor systems described herein are designed to measure. The temperature probe 100 may include a ferrule 102, a tip 110, a sensing element 118, a probe body 126, and a waveguide 128. The ferrule 102 may include at least one bore 104 sized to receive at least one tip 110. The tip 110 may include a tip body 112 that may have at least one counterbore 114 formed therein, wherein the counterbore 114 may be sized to receive at least one temperature sensing element 118 (also referred to herein as the "sensing element 118" or the "element 118"). The tip 110 and the sensing element 118 are placed in thermal communication with the surface 52 or other object to be measured.

In the illustrated embodiment, the sensing element 118 is provided as a thermographic phosphor configured to absorb at least a portion of optical excitation radiation 130 (also referred to herein as the "optical excitation signal 130") propagating through the waveguide 128 from an optical path (e.g., the optical path 250 shown in FIG. 5, 6 or 7) from a light source (e.g., the light source 218 shown in FIG. 5, 6 or 7) incident on the sensing element 118. The wavelength or spectrum of the optical excitation signal 130 may be chosen based on the excitation spectrum of the phosphor used in the sensing element 118. In some embodiments, the optical excitation signal 130 emitted by the light source 218 may have a wavelength of about 405 nm or a wavelength within the range of about 385 nm to about 410 nm. In other embodiments, the optical excitation signal 130 emitted by the light source 218 may have a wavelength of between about 370 nm and about 700 nm, depending on the choice of phosphor. Those skilled in the art will appreciate that the optical excitation signal 130 may have any wavelength or spectrum.

In the illustrated embodiment, the sensing element 118 absorbs at least a portion of the optical excitation signal 130 and emits a phosphorescent optical signal 120 (also referred to herein as an "optical excitation response signal 120") that, after the optical excitation signal 130 is turned off, has an intensity decay rate that depends at least in part on the temperature of the sensing element 118 and thereby, is related to the object temperature of the surface 52. In some embodiments, the sensing element 118 may also reflect a portion of the optical excitation response signal 120 as a reflected signal 125 that may have optical properties that are related to the object temperature. In various embodiments, the interior surfaces of the ferrule 102, the tip 112, and the sensing element 118 may emit black-body radiation 124 that may be coupled into the waveguide 128 as an optical-excitation-independent response signal 124. The optical excitation response signal 120, the reflected signal 125 and the optical excitation-independent response signal 124, may form a combined signal 122 that propagates through the waveguide 128 and the optical path 250 to a sensor sub-system (such as the sensor sub-system 201 shown in FIGS. 5-7). In various embodiments, the rate of decay if the intensity of the optical excitation response signal 120 and its associated time constant (measured in units of time, e.g., milliseconds), may be a characteristic of the phosphor material of the sensing element 118 and its temperature. "Time constant" is defined herein as the time required for the luminescence of the sensing element 118 to decrease to 1/e (about 36.8%) of the measured intensity immediately after the optical excitation signal 130 is turned off. In various embodiments, the desired time constant range of values may be selected by the choice of the phosphor material. In some embodiments, the time constant may range from about 1 ms to about 5 ms, though in other embodiments, the time constant may range from about 0.2 ms to about 12 ms. Those skilled in the art will appreciate that in other embodiments, luminescent sensing materials having time constants ranging from less than nanoseconds to more than seconds or tens of seconds may be used. In various embodiments, the combined signal 122 that includes at least a portion of at least one of the optical excitation response signal 120, the reflected signal 125, and the optical excitation-independent response signal 124, may be analyzed to evaluate one or more characteristics (e.g., a first characteristic and a second characteristic), such as, for example, the intensity decay rate, the time constant, the initial intensity, the average intensity, the wavelength, and the like, to be used to determine the object temperature. In various embodiments, for example, within certain object temperature ranges, the intensity of the optical excitation response signal 120 may be significantly larger than the intensity of the reflected signal 125 and/or the intensity of the optical excitation-independent response signal 124, thus permitting a determination of object temperature using only one or more characteristics of the optical excitation response signal 120.

In various embodiments, a "decay sampling period" may be defined as the number of time constants required for a signal intensity to reduce to a functionally insignificant level. For example, in some embodiments, after five time constants, the intensity of the optical excitation response signal 120 is about 0.7% of its original intensity and in various embodiments the optical excitation response signal 120 may be considered to have completely decayed. Those skilled in the art will appreciate that any amount of time or number of time constants may be selected to define a functionally or completely decayed optical excitation response signal 120. In some embodiments, the combined signal 122 may also decay, at least in part because a portion of the combined signal 122 may include all or a portion of the optical excitation response signal 120. For the purposes of this disclosure, "sampling" a means to take a reading of a measurement device such as a detector, (e.g., by a controller, data acquisition device, or sensing sub-system), at a particular point in time. For example, in one embodiment, "sampling" a detector during a decay sampling period means recording data from the detector receiving the optical signal, for example the excitation response signal 120 or the combined signal 122 after the optical excitation signal 130 is turned off, followed by recording data from the detector at intervals as the optical excitation response signal 120 decays. Of course, the detector may be sampled at any time, for any reason, including when the optical excitation signal 130 is turned on. For example, the detector may be sampled when no optical signal is incident on it, in order to provide a baseline measurement of the detector properties. The sampled data is communicated to and stored in a processor or controller configured to process the sampled data and calculate object temperature measurement results to be put out on a display or communicated to other equipment, such as automation systems that control or monitor semiconductor manufacturing or other types of equipment. In one embodiment, the temperature probe 100 may have an operating temperature range from about −200° C. to about 1,000° C. In another embodiment, the temperature probe 100 may have an operating temperature range from about −100° C. to about 750° C. Those skilled in the art will appreciate that the operating temperature range may be any value. Those skilled in the art will also appreciate that the temperature range of a phosphor-only temperature sensor system is limited at least in part by the particular choice of phosphor, the materials of construction of the temperature probe 100 or the temperature measurement system and the ability to distinguish the intensity of the optical excitation response signal 120 from the intensity of the optical-excitation-independent signal 124 and the intensity of the reflected signal 125 at the emission wavelength(s). In various embodiments, luminescent radiation received by the detector after the decay sampling period (also referred to herein as a "post-decay signal") may still be measurable and may need to be taken into account (e.g., subtracted, or compensated for) when processing the sampled data and computing object temperature measurement results. Those skilled in the art will appreciate that other characteristics besides intensity may be utilized, and that one or more of these may be used alone or in conjunction with other characteristics to distinguish between the various signals. Examples of other characteristics may include spectral characteristics, for example, the intensity of a signal within a spectral band, the presence of a signal within a spectral band, the ratio of various signals, or the like.

In various embodiments, the sensing element 118 may be provided as any of a wide variety of thermographic phosphor materials, including, without limitation, Manganese-doped phosphors $Mg_4FGeO_6$:Mn, Europium-doped phosphors $La_2O_2S$:Eu, $Y_2O_3$:Eu, $LuPO_4$:Eu, Dysprosium-doped phosphors $YVO_4$:Dy, $Y_2O_3$:Dy, $Y_3Al_5O_{12}$:Dy, $LuPO_4$:Dy, YAG:Dy, Chromium-doped phosphors $GdAlO_3$:Cr, $Al_2O_3$:Cr, $LaGaO_3$:Cr, $YAlO_3$:Cr, any stoichiometries of the foregoing, or the like or any combination thereof. The phosphor material may be chosen based on a variety of characteristics, such as its excitation spectrum, emission spectrum, luminescence decay rate as a function of temperature, emission intensity as a function of temperature, operating temperature range, or the like or any combination thereof. In various embodiments, the sensing element 118 may have an emission spectrum in the range of about 575 nm to about 775 nm. In various embodiments, the sensing element 118 may have an emission spectrum in the range of about 640 nm to about 720 nm. Those skilled in the art will appreciate that the emission spectrum of the sensing element 118 may have different ranges.

In various embodiments, components of the temperature probe 100 (e.g., the ferrule 102 and the tip 110) may include a number of interior surfaces (e.g., surfaces 106, 108, and 116) formed therein that may emit black-body radiation at a plurality of wavelengths or bands of wavelengths depending on their temperatures. In various embodiments, the sensing element 118 may also emit black-body radiation in addition to phosphorescent radiation. For the purpose of illustration, FIG. 2 shows only the portions of black-body radiation that propagate in the general direction of the probe body 126 and the waveguide 128, however in various embodiments the black-body radiation may propagate in any direction. Black-body radiation from the sensing element 118, the surfaces of the ferrule 102, and the surfaces of the tip 110 and any other black-body radiation emitting surfaces together comprise the black-body radiation 124. The intensity and wavelength spectrum of the black-body radiation 124 radiating from the surfaces of the ferrule 102 and the tip 110 may also be affected by the emissivity of the surface, for example, surfaces 106, 108, and 116. The emissivity of these surfaces depends on several factors, including, without limitation, the surface material, the material's surface roughness, and any surface treatments (e.g., coatings, passivation, plating), or the like or any combination thereof. Those skilled in the art will appreciate that any of a wide variety of attributes of the materials and surfaces will affect their emissivity. In various embodiments, the materials of the components of the temperature probe 100 (e.g., the ferrule 102 and tip 112) emitting the black-body 124 radiation, may be made of a material with a known emissivity to allow improved calibration of the system used to measure object temperature based on black-body radiation. In various embodiments, the material or materials that emit the black-body radiation may be the same, though in other embodiments these may include different materials. In various embodiments, the material or materials that emit the black-body radiation may be configured to have about the same or essentially the same emissivity value, for example, to allow improved calibration of temperature sensing based at least in part on the black-body radiation. In various embodiments, an effective emissivity value may be determined, either as a single value or as multiple values, for example as a function of temperature, to allow improved calibration of temperature sensing based at least in part on the black-body radiation.

In various embodiments, the temperature sensing system may be designed to exclude or ignore all or a portion of black-body radiation from surfaces other than from the sensing element 118, for example, by positioning or configuration of sensing element 118 and waveguide 128. For example, in various embodiments, the sensing element 118 may be positioned relatively close to or directly adjacent to the waveguide 128, for example to limit the collection of black-body radiation 124 by waveguide 128. In various embodiments, a spacing between the sensing element 118 and one end of the waveguide 128 (or one end of an optical fiber or fiber bundle comprising the waveguide 128) may be less than about 5 mm, or less than about 3 mm, or less than about 1 mm or may be close to zero.

As discussed herein, the intensity of the black-body radiation is directly proportional to the emissivity, where the emissivity varies (theoretically) from zero (0) to one (1). In various embodiments, the materials emitting black-body radiation may be made of or coated with a material having a relatively low emissivity value or otherwise configured to have a relatively low emissivity value, thus reducing the intensity or power level of the black-body radiation at any given temperature (e.g., relative to uncoated materials). The table below shows examples of approximate emissivity values for relatively low emissivity materials at particular temperatures (the emissivity varies with temperature). In various embodiments, typical ceramic materials used for high temperature probes, such as silicon carbide or aluminum nitride may have emissivity values in the range of about 0.8 to about 0.95, and in various embodiments, coating these with a relatively lower emissivity material may result in a reduction of the intensity of the black-body radiation by a relatively appreciable amount. For example, a material having an emissivity value of about 0.8 that is coated with a material having an emissivity value of about 0.26 (chromium) or about 0.03 (gold) may result in a reduction of the intensity of the black-body radiation by about a factor of about 3 or about 25, respectively. Those skilled in the art will appreciate that any of a wide variety of combinations of materials and coatings may have a wide variety of emissivity values.

| Material | Emissivity value | Temperature (° C.) |
|---|---|---|
| Aluminum, oxidized | 0.19 | 599 |
| Aluminum, unoxidized | 0.06 | 500 |
| Chromium | 0.26 | 538 |
| Gold, polished | 0.03 | 538-1093 |
| Molybdenum | 0.18 | 1092 |
| Molybdenum | 0.11 | 538 |
| Nickel, electrolytic | 0.16 | 1093 |
| Platinum | 0.10 | 538 |
| Silver, polished | 0.03 | 1093 |

In various embodiments, the coating may have more than one layer, with each layer formed of a different material. In various embodiments, the coating may include multiple alternating layers, for example metals and dielectric materials, to form a coated surface having a low emissivity value. In various embodiments, at least a portion of the interior surfaces of the components of the temperature probe 100 (e.g., the ferrule 102 and/or tip 110) may be made of or coated with a material or materials having an emissivity value less than about 0.7, or less than about 0.6, or less than about 0.3, or less than about 0.1. Alternatively, the interior surfaces of the components of the temperature probe 100 may be uncoated, and have an emissivity value less than about 0.7, or less than about 0.6, or less than about 0.3, or less than about 0.1.

Figure 5:
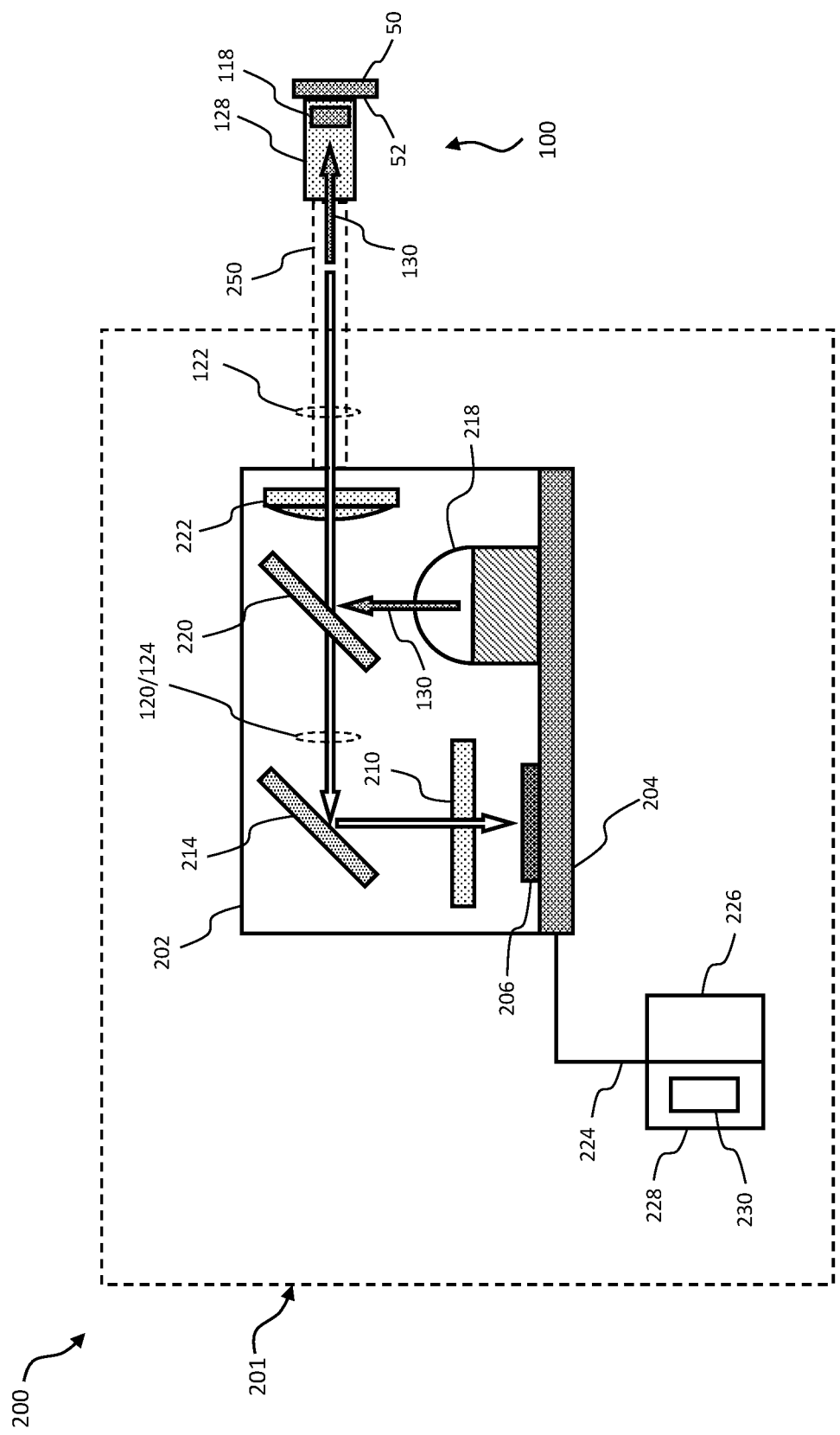
FIG. 5 shows a schematic view of an embodiment of an exemplary temperature sensor system.
Figure 6:
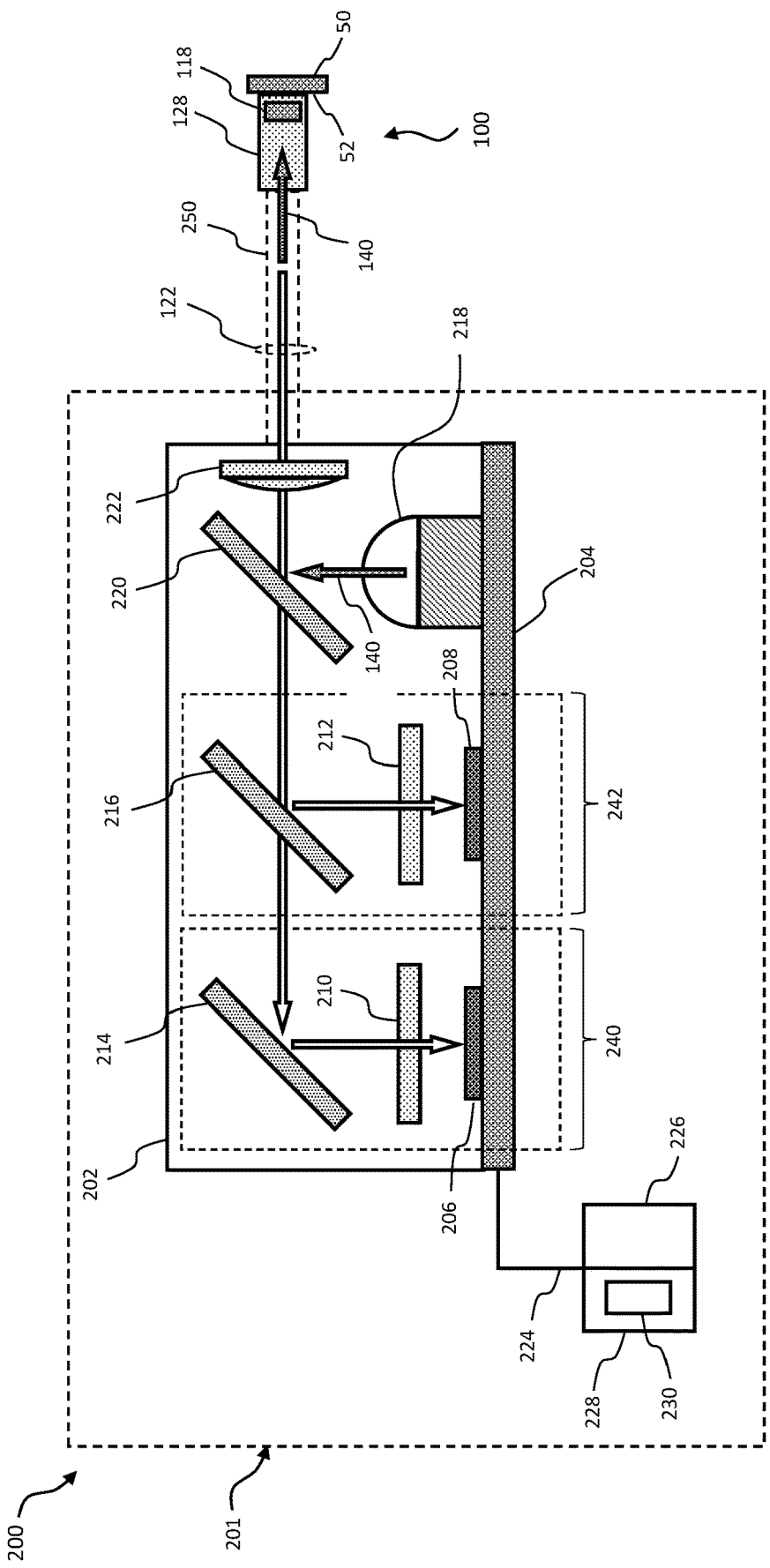
FIG. 6 shows a schematic view of an alternate embodiment of an exemplary temperature sensor system.
Figure 7:
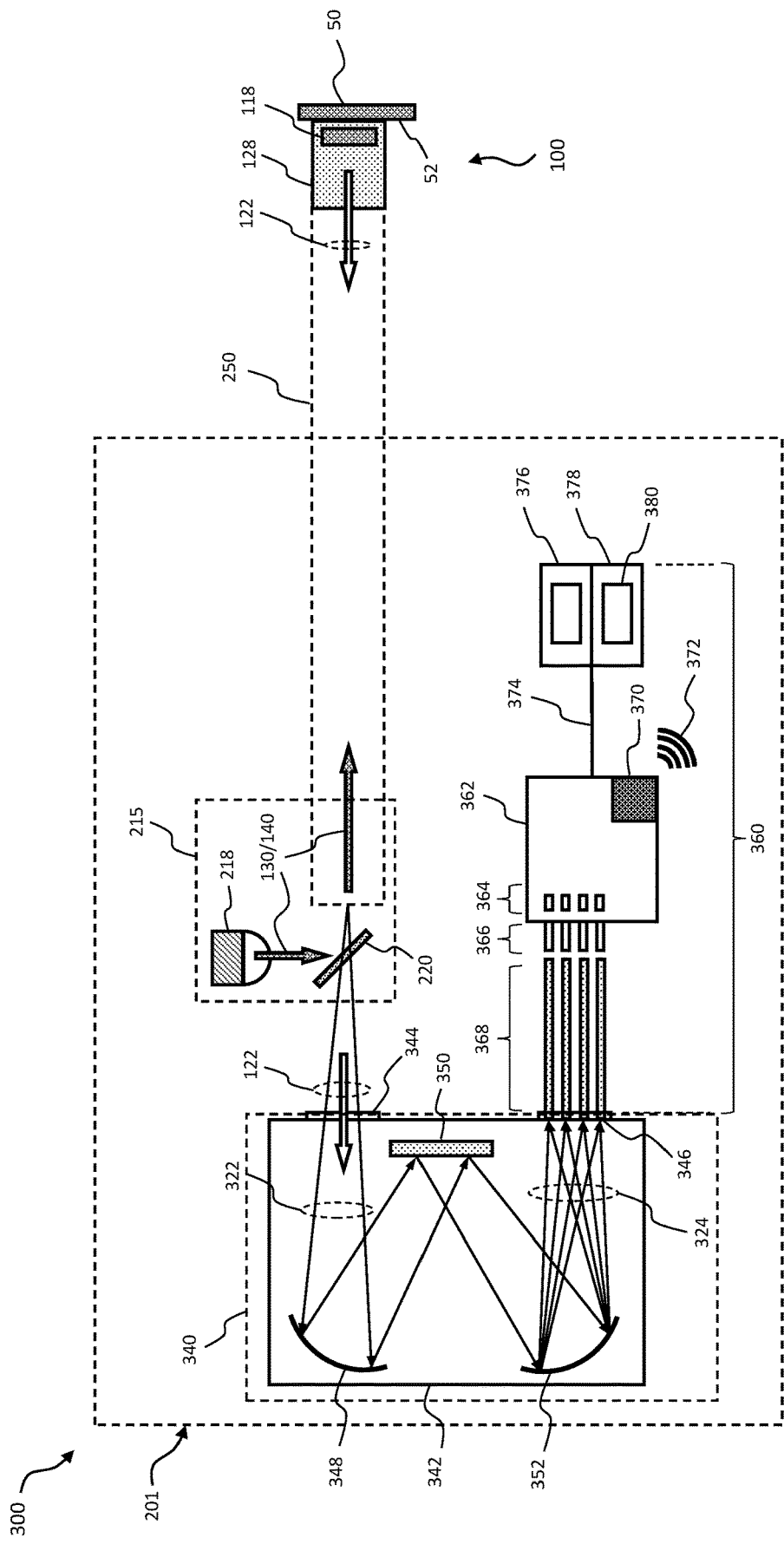
FIG. 7 shows a schematic view of an alternate embodiment of an exemplary temperature sensor system.

The optical-excitation-independent signal 124 may include multiple characteristics, such as, for example, an intensity of black-body radiation, a wavelength or spectrum of black-body radiation, and the like. The various characteristics of the optical-excitation-independent signal 124 may be used to provide information to the sensor system controller in order to calculate an object temperature. In various embodiments, the optical-excitation-independent signal 124 that propagates through the waveguide 128 to the sensor sub-system 201 (for example as shown in FIGS. 5, 6 and 7) may be radiated independent of any optical excitation response signal. In various embodiments, the intensity of the optical-excitation-independent signal 124 may depend, among other things, on the temperature of the surfaces and on the emissivity of the surfaces.

In various embodiments, at least a portion of at least one of the optical excitation response signal 120, the optical-excitation-independent signal 124, and the reflected signal 125 may be coupled into the waveguide 128 to form a combined signal 122. In various embodiments, the portion of the optical excitation response signal 120, the optical-excitation-independent signal 124 and the reflected signal 125 that does not couple into the waveguide 128 either reflects off of the probe body 126 or the facet of the waveguide 128. In various embodiments, the amount of combined radiation incident on the facet of the waveguide 128 that is not coupled into the waveguide 128 results from a variety of factors, including angle of incidence of the black-body radiation and properties of the waveguide (e.g., the index of refraction of the waveguide material, coatings applied to the facet, and the like). In various embodiments, depending on the material of the waveguide 128, some of the combined signal 122 may be absorbed before reaching the sensor system 200.

Figure 3:
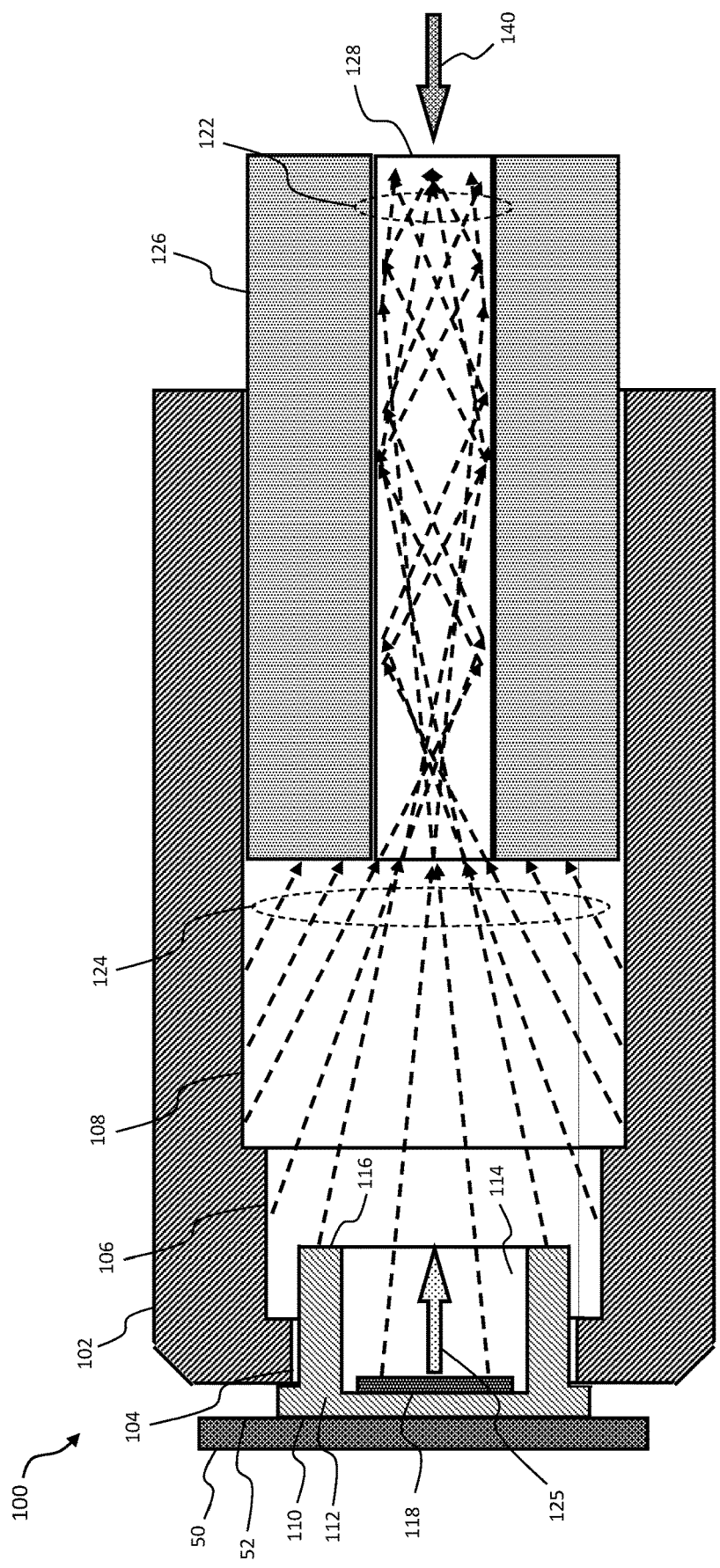
FIG. 3 shows a schematic cross-section view of an embodiment of a portion of a fiber-optic temperature probe for measuring an object temperature using a sensing material with a temperature-sensitive band gap and black-body radiation.

FIG. 3 shows a cross-section view of a portion of an exemplary temperature sensing device 100 (also referred to herein as "temperature probe 100" or "probe 100") operative to measure the object temperature of a surface 52 of a target 50. In similar fashion to FIG. 2, the temperature probe 100 may include a ferrule 102, a tip 110, a sensing element 118, a probe body 126, and a waveguide 128. The ferrule 102 may include at least one bore 104 sized to receive at least one tip 110. The tip 110 may include a tip body 112 that may have at least one counterbore 114 formed therein, wherein the counterbore 114 may be sized to receive at least one temperature sensing element 118. The tip 110 and the sensing element 118 are placed in thermal communication with the surface 52 or other object to be measured. In the illustrated embodiment, the sensing element 118 is provided as a band-gap type sensor that has a temperature-dependent band gap that can be measured by the reflection at least a portion of optical illumination radiation 140 (also referred to herein as "the illumination signal 140") propagating through the waveguide 128 and an optical path (e.g., the optical path 250 shown in FIG. 5, 6 or 7) from a light source (e.g., the light source 218 shown in FIG. 5, 6 or 7). The wavelength or spectrum of the illumination signal 140 is chosen based on the reflection spectrum of the band-gap-type sensing material used as the sensing element 118. In various embodiments, the illumination signal 140 may have a broadband wavelength range throughout a portion of the visible spectrum from about 450 nm to about 700 nm. In some embodiments, the optical excitation signal 140 may have a wavelength band between about 370 nm to about 900 nm, depending on the choice of the band-gap-type sensing element 118. Those skilled in the art will appreciate that the illumination signal 140 may have any wavelength or spectrum. In various embodiments, the band-gap-type sensing element 118 may reflect an illumination signal 140 as a reflected signal 125 that is coupled into the waveguide 128 and propagates back toward the sensor sub-system 201 shown in FIGS. 5, 6 and 7. The properties of the reflected signal 125 are related to the temperature of the band-gap-type sensing element 118, and, thereby, the temperature of the tip 110 and the surface 52. Analysis of one or more characteristics of the reflected signal 125 may be used to determine the object temperature.

In various embodiments, the sensor system may be designed to exclude or ignore all or a portion of black-body radiation from surfaces other than from the sensing element 118 or other radiation, for example by positioning or configuration of the sensing element 118 and the waveguide 128. For example, in various embodiments, the sensing element 118 may be positioned relatively close to or directly adjacent to the waveguide 128, for example to limit the collection of signals or radiation other than reflected signal 125. In various embodiments, the spacing between the sensing element 118 and the waveguide 128 may be less than about 5 mm, or less than about 3 mm, or less than about 1 mm or may be essentially zero.

Figure 4:
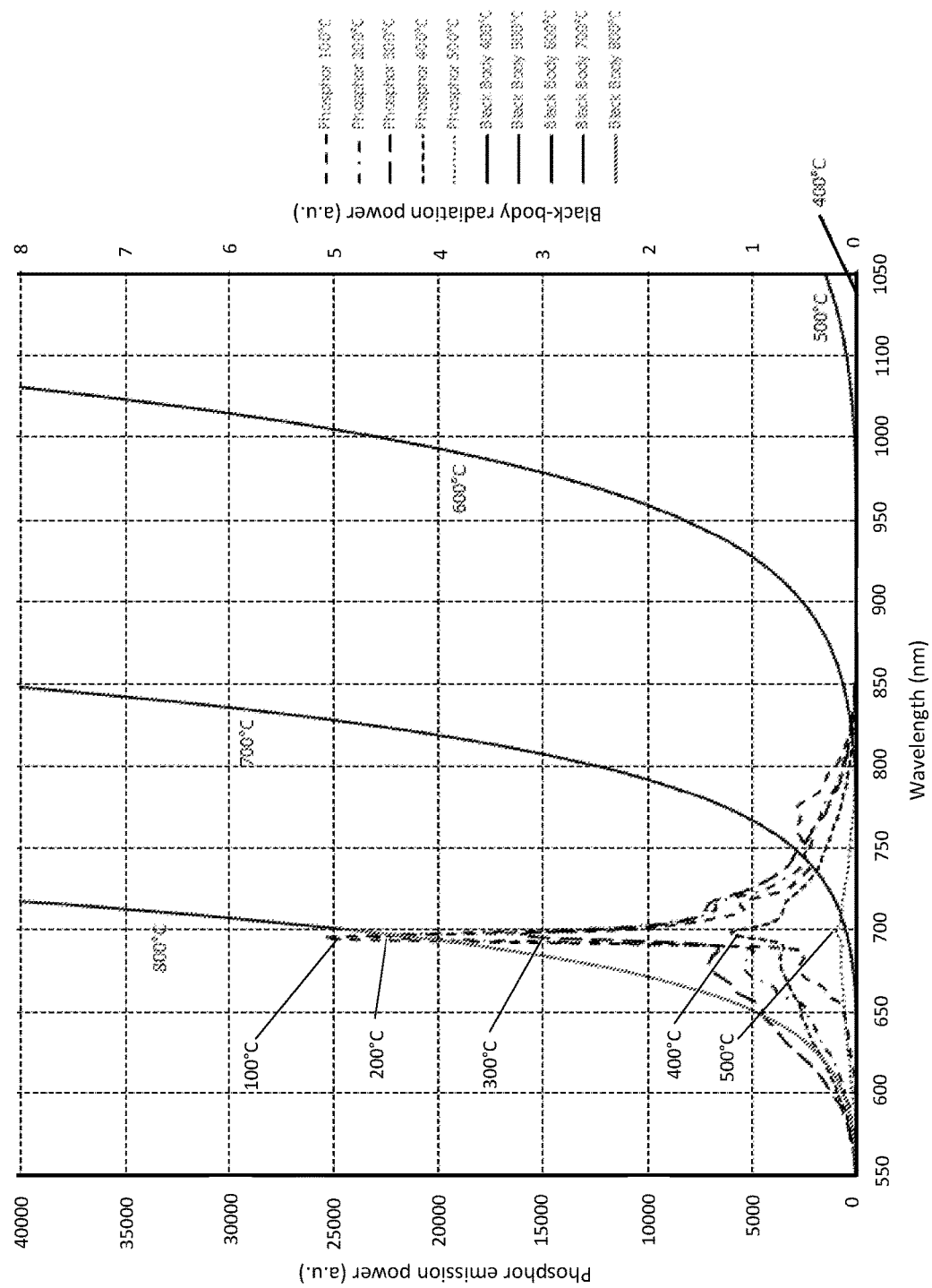
FIG. 4 shows the optical power spectrum of an exemplary thermographic phosphor and a black body at various temperatures.

FIG. 4 shows a graph of the optical power spectrum (also referred to herein as the "spectral power distribution") of an exemplary phosphor sensing element at different temperatures, and the optical power spectrum (also referred to herein as the "spectral power distribution") of a black-body at different temperatures. The dashed lines show the illustrative optical power spectrum of an exemplary phosphor sensing element and the solid lines show an illustrative optical power spectrum of black-body radiation. One notable aspect of this graph is that the optical power spectrum of black-body radiation shifts towards shorter wavelengths and thus becomes more prevalent in the response spectrum of a silicon detector (about 400 nm to about 1,050 nm) above about 600° C. or about 700° C. A second notable aspect of this graph is that the amplitude of the optical power spectrum of the exemplary phosphor sensing element may be significantly reduced above a temperature of about 500° C. The intensity of phosphorescent radiation emitted by many thermographic phosphors decreases with temperature, for example by a mechanism known as "quenching". Quenching contributes to the increasing dominance of black-body radiation as a portion of total radiation received as the phosphor temperature (and the object temperature) increases. The amount of the quenching effect is generally dependent upon the specific choice of phosphor. In various embodiments, the optical excitation response signal 120 emitted by the phosphor sensing element 118 has an optical power spectrum that may be characterized by at least one optical bandwidth having at least one lower wavelength and at least one upper wavelength, between which all or essentially all of the optical excitation response signal 120 is contained. For example, referring to FIG. 4, the lower wavelength of the optical bandwidth of the optical excitation response signal 120 may be about 550 nm and the upper wavelength of the optical bandwidth may be about 850 nm, making the optical bandwidth about 300 nm. In other embodiments, at least 75% of the power of the optical excitation response signal 120 is within the optical bandwidth, or at least 85% or at least 95% of the power of the optical excitation response signal 120 is within the optical bandwidth. The intensity of black-body radiation may start to contribute to the total detected signals (e.g., the combined signal 122) even at temperatures where there is no or relatively little spectral overlap between the phosphor emission and the black-body emission, because the detector may detect radiation over a wider range of wavelengths than the optical power spectrum of the optical excitation response signal 120. For example, an exemplary silicon detector may detect wavelengths out to about 1,050 nm, and thus the total detector signal may include a portion of the black-body radiation (i.e., the optical-excitation-independent signal 124), depending on the measured object temperature.

Though optical filters can be placed within the optical path to reduce the amount of black-body radiation reaching the detector, measurement errors can still be significant, particularly when the peak of the black-body radiation is close to or overlapping that of the radiation emitted by the phosphor. At relatively low object temperatures, for example, below about 400° C., there may be almost no interference between the black-body radiation and the phosphor emission. However, as the object temperature increases, the power of the phosphor emission may eventually be overpowered by the power of the black-body radiation, precluding the ability to use only the characteristics of the phosphor emission to determine the object temperature. In various embodiments, at least a portion of the black-body radiation emitted at wavelengths longer than the long-wavelength end of the optical power spectrum or the optical bandwidth of the optical excitation response signal 120 emitted by the phosphor sensing element 118 may be filtered out, for example using a dichroic mirror, short-pass filter or other means known to those skilled in the art. In various embodiments, the short-pass filter may be configured to have a cut-off wavelength located within about 10% of the upper wavelength of the optical bandwidth of the optical excitation response signal 120.

In various embodiments, a portion of the black-body radiation emitted at wavelengths shorter than the short-wavelength end of the spectral power distribution of the phosphor sensing element 118 may be filtered out using similar means. In various embodiments, a notch filter may be configured from one or more filter elements, to filter out radiation outside of the optical power spectrum of the phosphor.

FIG. 5 shows a schematic view of an exemplary temperature sensor system 200 including a sensor sub-system 201, the optical path 250 and temperature probe 100, wherein the sensor sub-system 201 is configured to provide an optical excitation signal 130 or illumination signal 140 and to measure one or more properties or characteristics of the combined signal 122 (including one or more portions of the optical excitation response signal 120, the optical-excitation-independent signal 124, and/or the reflected signal 125) received from the temperature probe 100. The sensor sub-system 201 is in optical communication with the temperature probe 100 via the optical path 250, wherein the optical path 250 is configured to allow the combined signal 122 (including one or more portions of the optical excitation response signal 120, the optical-excitation-independent signal 124, the reflected signal 125) to propagate to the sensor sub-system 201. In various embodiments, the waveguide 128 of the temperature probe 100 is considered part of the optical path 250. In the illustrated embodiment, the optical path 250 is provided as an optical fiber or an optical fiber bundle having a first end and a second end opposite the first end. As such, the waveguide 128 may also be provided as an optical fiber, optical fiber bundle, optical rod or other optical guide having a first end and a second end opposite the first end. In other embodiments, the optical path 250 may comprise an optical train configured to allow the signals 120, 124, 125, and 122 to propagate through free space or a combination of free-space, optical fibers, waveguides, and various optical elements, such as refractive or reflective optical elements. In still other embodiments, the optical path 250 may also include any of a wide variety of optical elements operative to allow the optical excitation signal 130 and/or illumination signal 140 (not shown in FIG. 5) to propagate to the temperature probe 100.

In various embodiments, the sensor sub-system 201 provides the optical excitation signal 130 (or illumination signal 140) to the temperature probe 100 and receives and measures the returning optical excitation response signal 120 and the optical-excitation-independent signal 124. In these embodiments, a reflected signal 125 may be present in the optical path 250, but it may be filtered out by the optical element 220 or other optical elements, which may be provided as a dichroic filter, such as the filter 210. In various embodiments, the optical excitation response signal 120, the optical-excitation-independent signal 124, and the reflected signal 125 may overlap in space because they propagate through the waveguide 128 and the optical path 250 when returning from the temperature probe 100, and may be also collectively referred to as the combined signal 122.

In various embodiments, when the sensing element 118 is provided as a band-gap-type sensing material, the sensor sub-system 201 provides the illumination signal 140 to the temperature probe 100 and receives and measures the returning optical-excitation-independent signal 124 and the reflected signal 125. In various embodiments, the optical-excitation-independent signal 124 and the reflected signal 125 may overlap in space because they both propagate through the waveguide 128 and the optical path 250 when propagating from the temperature probe 100, and as described elsewhere herein, collectively form the combined signal 122. In addition, the spectrum of the illumination signal 140 may overlap with the spectrum of the reflected signal 125, so the optical element 220 must be able to transmit and reflect light of the same wavelength. For example, the optical element 220 may be a beamsplitter, to enable a portion of the reflected signal 125 to reach the detector 206.

In the illustrated embodiment, the sensor system 200 or the sensor sub-system 201 includes an optional housing 202 with at least one light source 218, at least one detector 206, at least one first optical element 220 and at least one optional optical element 214, and an optional optical element 222 (shown as a lens) may be positioned in the housing 202 in optical communication with the optical path 250. In various embodiments, a power supply 226, a controller 228 and an optional display 230 are in electrical communication with the light source 218 and detector 206 by a communications link 224, though in some embodiments the power supply 226, the controller 228, and the display 230 may be mounted in or on the housing 202. In various embodiments, the controller 228 and the optional display 230 may be in wireless communication with the detector 206 and the light source 218. Optionally, though not shown in FIGS. 5 and 6, the controller 226 may be configured to provide a wired or wireless signal to additional equipment. In various embodiments, the detector 206 and the light source 218 may be optionally mounted to a substrate 204 or to the housing 202. In some embodiments, the controller 228 may include both control functions and processing functions as required for operation. For example, the controller 228 may be configured to drive the light source 218 to emit at least one optical excitation signal 130 or at least one illumination signal 140 to the temperature probe 100 at wavelengths, intensities, and durations required for a particular function of the sensor sub-system 201. The detector 206 is configured to receive at least a portion of one or more of the optical excitation response signal 120, the optical-excitation-independent signal 124, the reflected signal 125, and the combined signal 122, and to provide at least one signal representative of the optical excitation response signal 120, the optical-excitation-independent signal 124, the reflected signal 125, and the combined signal 122 to the controller 228. In various embodiments, the controller 228 may be configured to gather measurement data by sampling the detector 206 and any other detectors or devices (e.g., temperature measurement devices). Also, the controller 228 may be configured to separate a signal representative of the combined signal 122 into at least one signal representative of the optical excitation response signal 120 and at least one signal representative of the optical-excitation-independent signal 124. For example, in one embodiment, the controller 228 samples the detector 206 that provides a signal representative of the combined signal 122 to the controller 228. If the signal representative of the combined signal 122 does not vary with time, the controller 228 can separate that portion of the signal as being the signal representative of the optical-excitation-independent signal 124. If the signal representative of the combined signal 122 has an intensity decay rate, then the controller 228 can identify the portion of the combined signal 122 having the intensity decay rate as being the optical excitation response signal 120.

The controller 228 is configured to calculate an object temperature based on at least one of the optical excitation response signal 120 and the signal representative of the optical-excitation-independent signal 124. The signal representative of the optical-excitation-independent signal 124 comprises at least one first characteristic of the signal representative of the optical-excitation-independent signal 124, and the signal representative of the optical excitation response signal 120 comprises at least one second characteristic of the signal representative of the optical excitation response signal 120, wherein the first characteristic may be the same as or different from the second characteristic. The first characteristic or the second characteristic may comprise an intensity or amplitude, a change in intensity or amplitude over a time period, an intensity decay rate, an optical power spectrum, or one or more portions of an optical power spectrum of the optical excitation response signal 120 or the optical-excitation-independent signal 124 or the like. The controller 228 then can calculate an object temperature based on at least one of the first characteristic of the signal representative of the optical-excitation-independent signal 124 and the second characteristic of the signal representative of the optical excitation response signal 120. The first characteristic of the signal representative of the optical-excitation-independent signal 124 may comprise an intensity of black-body radiation or an intensity of at least one wavelength of black-body radiation. The second characteristic of the signal representative of the optical excitation response signal 120 may comprise an intensity decay rate or an intensity of at least one wavelength of the optical excitation response signal 120.

In some embodiments, the controller 228 may determine at least one signal representative of the optical-excitation-independent signal 124 at a first time (e.g., before the optical excitation signal 130 has been turned on), and determine at least one signal representative of the optical excitation response signal 120 at a second time (e.g., after the optical excitation signal 130 has been turned on, or after the optical excitation signal 130 has been turned off and the optical excitation response signal 120 is decaying). The controller 228 then may calculate an object temperature based on at least one of the signal representative of the optical-excitation-independent signal 124 determined at the first time and the signal representative of the optical excitation response signal 120 determined at the second time. The signal representative of the optical-excitation-independent signal 124 at the first time comprises at least one first characteristic of the signal representative of the optical-excitation-independent signal 124 at the first time. For example, in various embodiments, the first characteristic or the second characteristic may comprise an intensity or amplitude, a change in intensity or amplitude over a time period, an intensity decay rate, an optical power spectrum, or one or more portions of an optical power spectrum.

The signal representative of the optical excitation response signal 120 at the second time comprises at least one second characteristic of the signal representative of the optical excitation response signal 120 at the second time. In some embodiments, the first characteristic may be the same as the second characteristic. In other embodiments, the first characteristic may be different from the second characteristic. For example, in various embodiments, the first characteristic or the second characteristic may comprise an intensity or amplitude, a change in intensity or amplitude over a time period, an intensity decay rate, an optical power spectrum, or one or more portions of an optical power spectrum, or the like. The controller 228 may be configured to calculate an object temperature based on at least one first characteristic of the signal representative of the optical-excitation-independent signal 124 at the first time and at least one second characteristic of the signal representative of the optical excitation response signal 120 at the second time. In various embodiments, the first characteristic of the signal representative of the optical-excitation-independent signal 124 at the first time comprises an intensity of black-body radiation, a wavelength of black-body radiation, or an intensity of black-body radiation at one wavelength.

In various embodiments, the second characteristic of the signal representative of the optical excitation response signal 120 at the second time comprises an intensity decay rate of the optical excitation response signal 120 of an intensity of at least one wavelength of the optical excitation response signal 120.

In addition, the controller 228 may also be configured to perform any required calibration or compensation of various devices (e.g., the detectors 206 and 208, the light source 218, and the like). In various embodiments, the controller 228 may be configured to process the measurement data received from the detectors and other measurement devices in the sensor sub-system 201, compute any compensations or corrections or other processing functions to calculate final object temperature measurement results. In various embodiments, the controller 228 may be configured to transmit any measurement data or results to other devices (e.g., displays, process equipment, and the like.)

In the illustrated embodiment, the optical element 220 may be a dichroic filter or dichroic mirror. In various embodiments, the light source 218 may be configured to emit the optical excitation signal 130 that is directed to the optical path 250 by the dichroic mirror 220 and lens 222. In various embodiments, the optical element 220 may be configured to reflect the optical excitation signal 130 and allow the optical-excitation-independent signal 124 and the optical excitation response signal 120 to propagate therethrough. For example, in the illustrated embodiment, the optical element 220 may be a dichroic filter configured to reflect greater than about 95% of the excitation signal 130 from the light source 218 to the optical path 250 and allow greater than about 95% of the optical-excitation-independent signal 124 and optical excitation response signal 120 to propagate therethrough toward the second mirror or optical element 214 configured to reflect the optical-excitation-independent signal 124 and optical excitation response signal 120 toward the detector 206. In various embodiments, the optical properties of the optical element 220 may be selected based on the emission characteristics of different phosphor materials used in the sensing element 118. Those skilled in the art will appreciate that the optical element 220 may be configured to reflect any of a variety of percentages of the optical excitation signal 130 from the light source 218 to the optical path 250 and allow any of a variety of percentage of the optical-excitation-independent signal 124 and optical excitation response signal 120 to pass therethrough. In various embodiments, the positions of the light source 218 and detector 206 may be swapped if an optical element 220 is chosen that transmits the excitation signal 130 and reflects the optical-excitation-independent signal 124 and optical excitation response signal 120, for example by using a hot mirror in place of a cold mirror. Those skilled in the art will appreciate that the light source 210, the detector 206, and various optical elements may be positioned relative to the housing 202 and the optical path 250 in any of a variety of ways.

In various embodiments, though not shown in FIG. 5, the optical element 220 may be provided as an optical splitter (e.g., a bulk optical beamsplitter, fiber optic splitter, bifurcated optical fiber bundle, or optical circulator) instead of a dichroic filter or dichroic mirror. Those skilled in the art will appreciate that any of a wide variety of optical arrangements may be used to direct the optical excitation signal 130 or illumination signal 140 to the optical path 250 and to allow the combined signal 122 (including portions of at least one of the optical excitation response signal 120, the optical-excitation-independent signal 124, and the reflected signal 125) to propagate to the detector 206. In various embodiments, the wavelength of the optical excitation signal 130 emitted by the light source 218 and the transmission and reflection band of the optical element 220 and filter 210 may be chosen to match the excitation spectrum and emission spectrum of the phosphor sensing element 118. In other embodiments, the wavelength of the optical excitation signal 130 emitted by the light source 218 and the transmission and reflection band of the optical element 220 and filter 210 may be chosen to match the excitation spectrum and emission spectrum of any of a variety of phosphor sensing elements.

Though only a single detector 206 is shown in FIG. 5, any number or variety of detectors or detector arrays may be used, depending on the wavelengths of the signals 120, 124, and 125 to be measured. In various embodiments, the radiation reaching the multiple or variety of detectors may include the optical excitation response signal 120, the optical-excitation-independent signal 124, or the reflected signal 125 propagating from the optical probe 100 as described above with respect to FIG. 2 or FIG. 3.

In embodiments where the sensing element 118 is provided as a band-gap-type sensing material, the reflected signal 125 may have a similar or essentially the same or the same wavelength as the illumination signal 140 emitted by the light source 218 or may have an optical power spectrum that overlaps with the optical power spectrum of the illumination signal 140, and the optical element 220 may be a beamsplitter capable of both transmitting and reflecting the illumination signal 14 and the reflected signal 125. In various embodiments, the detector 206 may be configured to receive the reflected signal 125 returning towards the light source 218, and may be positioned inside or adjacent to the package or housing of the light source 218. In various embodiments in which the optical element 220 is a beamsplitter, a fraction of the reflected signal 125 may pass through the optical element 220 and may be received by the detector 206 while another fraction of the reflected signal 125 may be reflected by the optical element 220 and may be received by a detector inside or adjacent to the package of the light source 218. In various embodiments light source 218 may be configured to act as a detector, for example when not functionally enabled to emit light or radiation.

In various embodiments (though not shown in FIG. 5), at least one temperature sensor (thermocouple, thermistor, second photodiode, etc.) may be positioned in thermal communication with the detector 206 and configured to provide information regarding the temperature of the detector 206 (also referred to herein as a "system temperature") that may be used to identify and correct for temperature-based effects of the detector, or its amplification and/or processing circuit. In other embodiments, this temperature sensor may be attached to or integrated with the detector 206. In addition, in various embodiments, at least one temperature sensor (thermocouple, thermistor, second photodiode, etc.) may be positioned in thermal communication with the controller 228 and/or within the optional housing 202 and configured to provide information regarding the temperature of the controller 228 and/or the temperature within the optional housing 202 that may be used to identify and correct for temperature-based effects of the controller 228 or its amplification and/or processing circuits.

In various embodiments, at least one filter 210 may be positioned in optical communication with the detector 206, for example, between the detector 206 and the sensing element 118 in order to prevent stray light (or light having wavelengths not intended for detection) from reaching the detector 206. In various embodiments, the filter 210 may be a longpass filter configured to transmit about at least 95% of light emitted by the phosphor sensing element (e.g., from about 575 nm to about 800 nm for the exemplary phosphor shown in FIG. 4) to the detector 206. The filter 210 may be provided as any combination of shortpass, bandpass, notch, or neutral density filters. Those skilled in the art will appreciate that any of a wide variety of filters having a wide variety of performance specifications can be used. Optionally, no filters may be used.

In various embodiments, the detector 206 (and the detector 208 shown in FIG. 6) may be provided as any of a wide variety of detectors or instruments selected for their spectral responsivity or wavelength responsivity, such as photodiodes, CCD or CMOS sensors, thermopiles, or bolometers. For example, in various embodiments, the detector 206 may be a silicon (Si) detector, having a wavelength responsivity range (also referred to herein as "response spectrum") for example from about 400 nm to about 1,050 nm. In various embodiments, the detectors 206, 208 may be chosen from any of a wide variety of detectors, including, without limitation, Germanium (Ge), Indium Gallium Arsenide (InGaAs), Gallium Arsenide (GaAs), Lead (II) Sulfide (PbS), Mercury Cadmium Telluride (HgCdTe) Gallium Nitride (GaN), Cadmium Zinc Telluride (CdZnTe), Gallium Phosphide (GaP), and Mercury Cadmium Telluride (HgCdTe) and similar detectors may be used. In various embodiments, the detectors 206, 208 may be provided as multiple detectors, multi-junction detectors, or detector arrays selected from the aforementioned list. In various embodiments, the detectors 206, 208 may include multiple detector layers stacked or formed on top of each other in a "sandwich" configuration. In various embodiments, multiple detectors having different response spectra or overlapping response spectra may be arranged in a "bounce" configuration, wherein the light signal is incident on a first detector (e.g., a silicon detector having a response spectrum from about 400 nm to about 1,050 nm), and the portion of the light signal not absorbed by the first detector is reflected to a second detector (e.g., a Germanium detector having a response spectrum from about 900 nm to about 1,600 nm). When provided as such, the combined wavelength responsivity curve may not include any significant gaps in response over the combined response spectra of the two detectors. Any remaining signal not absorbed by either detector may be routed to a beam dump. In various embodiments, the detectors may also be provided as thermopiles for the detecting wavelengths in the near-infrared, medium-infrared, and far infrared spectra. In various embodiments, the detectors may be replaced by various light analysis instruments, such as spectrometers, spectrographs, monochromators (e.g., Czerny-Turner monochromators), and the like. Those skilled in the art will appreciate that any of a wide variety of detectors or instruments may be used to measure the properties of the combined signal 122 or other signals received from the temperature probe 100 or the optical path 250.

In various embodiments, the sensing element 118 may include one or more band-gap-type sensors or sensing materials having a temperature-dependent band gap (i.e., the energy gap between the valence band maximum and the conduction band minimum). The temperature-dependent band gap can be measured by measuring the spectrum of light reflected from the band-gap-type sensing material (i.e., the "reflectance spectrum") when it is illuminated by the illumination signal 140. The reflectance spectrum can be characterized by a cut-off wavelength (measured, for example, in nanometers), at which the intensity of the reflected light rises from a low measured intensity to a high measured intensity. Band-gap-type sensing materials include, without limitation, elemental semiconductor materials such as silicon (Si) or germanium (Ge) or compound semiconductor materials such as gallium arsenide (GaAs), indium phosphide (InP), silicon carbide (SiC), aluminum nitride (AlN), zinc sulfide (ZnS), zinc selenide (ZnSe), cadmium telluride (CdTe) as well as a wide range of other compound semiconductor material alloys known to those skilled in the art.

In various embodiments, when the sensing element 118 is provided as a band-gap-type sensing material (e.g., GaAs), placed in thermal communication with the object to be measured, the light source 218 may be configured to emit a broadband illumination signal 140 (e.g., from a white light source or other broadband light source (such as a white-emitting LED, a laser, or a halogen light bulb)) incident on the sensing element 118 and the optical element 220 may be configured to reflect and transmit white light (e.g., a beamsplitter). In various embodiments, the band-gap-type sensing element 118 may be configured to reflect the illumination signal 140 as at least one reflected signal 125 having a reflectance spectrum, wherein the reflectance spectrum depends on the band gap of the band-gap-type sensing material 118 at a given temperature. As such, in this embodiment, the temperature probe 100 emits a combined signal 122 that comprises at least a portion of the optical-excitation-independent signal 124 and at least a portion of the reflected signal 125. The sensor system 200 includes at least one optical path 250 configured to allow the illumination signal 140 to propagate to the sensing element 118 and to allow at least a portion (or all of) the combined signal 122 to propagate to the detector 206, wherein the detector 206 is configured to provide at least one signal representative of the combined signal 122 to the controller 228, and wherein the controller 228 is configured to separate the signal representative of the combined signal 122 into at least one characteristic of the optical-excitation-independent signal 124 and at least one characteristic of the reflected signal 125. The controller 228 is configured to calculate an object temperature based on at least one of the signal representative of the optical-excitation-independent signal 124 and the signal representative of the reflected signal 125.

In some embodiments, the combined signal 122 may be measured using a spectrometer or other spectral measurement sensor instead of the detector 206. In other embodiments, the combined signal 122 may be received by at least one of the detectors, e.g., the detector 206 and the detector 208 (as described herein with respect to FIG. 6), wherein the detectors 206 and 208 are configured to generate a signal representative of the optical intensity or wavelength of at least one portion of the combined signal 122. In various embodiments, the optical-excitation-independent signal 124 (e.g., from the temperature probe 100 while the illumination signal 140 is turned off) may be subtracted from the combined signal 122 (e.g., when the illumination signal 140 is turned on), to yield the reflected signal 125. In various embodiments, a measurement of the cut-off wavelength of the band-gap-type signal (e.g., by the spectrometer) may be performed on this reflected signal 125. In various embodiments, an object temperature associated with the measured cut-off wavelength may be calculated (e.g., in the controller 228). In various embodiments, any signal returned from the band-gap-type sensing element 118 while the illumination signal 140 is turned off may be used to measure the black-body radiation emitted from the band-gap-type sensing element 118 or components of the temperature probe 100, based on which an object temperature associated with the black-body radiation may be calculated. In some embodiments, the black-body radiation within the wavelength range of the spectrometer may be summed up and used to infer or determine the object temperature. In other embodiments, the optical power spectrum of the measured black-body radiation may be compared to the spectral radiance spectrum in accordance with Planck's law to infer or determine the object temperature that is most likely to have produced this spectral radiance spectrum, for example, through a least squares fit of the spectral radiance spectrum to a function representing Planck's law. In other embodiments, other semiconductor materials having temperature-dependent band gaps may be used. Those skilled in the art will appreciate that different band-gap-type sensing materials may be selected based on the desired object temperature range, for example, based on the temperature sensitivity of the band gap, the thermal stability of the band-gap-type sensing material and other factors known to those skilled in the art.

FIG. 6 shows a view of an alternate embodiment of the sensor system 200 similar to that discussed in reference to FIG. 5, but that includes two "measurement channels". In this embodiment, the sensor sub-system 201, the optical path 250, and the temperature probe 100 are provided as described above with respect to FIG. 5, except that the optional housing 202 may include a second optical element 216 arranged and configured to reflect at least a portion of the combined signal 122 to a second detector 208 optionally mounted in the housing 202 or on the substrate 204. The sensor sub-system 201 is in optical communication with the temperature probe 100 and is configured to direct an optical excitation signal 130 or illumination signal 140 to the temperature probe 100 via the optical path 250. The optical path 250 is configured to allow the combined signal 122 (including one or more portions of the optical excitation response signal 120, the optical-excitation-independent signal 124, the reflected signal 125) to propagate to the sensor sub-system 201. The sensor sub-system 201 is configured to measure one or more properties or characteristics of the combined signal 122 (including properties of one or more portions of the optical excitation response signal 120, the optical-excitation-independent signal 124, and/or the reflected signal 125) propagating from the temperature probe 100.

In various embodiments, the addition of the optical element 216, the detector 208 and the filter 212 adds a second "channel" to the sensor sub-system 201, enabling additional flexibility in configuring the sensor sub-system 201 for a broader array of measurements. Those skilled in the art will appreciate that the sensor sub-system 201 may include additional channels, depending on end-use application requirements. In various embodiments, the two-channel configuration shown in FIG. 6 may be converted into a single-channel configuration by, for example, removing the optical element 216 or by changing the orientation of the optical element 216 so that the combined signal 122 is not incident on it. The properties of the optical element 216 may be chosen to allow any of a variety of wavelengths or wavelength bands to propagate therethrough and reflect any of a variety of wavelengths or wavelength bands to the detector 208. In various embodiments, at least one second filter 212 may be placed in optical communication with the combined signal 122 and the second detector 208, for example to prevent stray light or other radiation from reaching the detector 208. In some embodiments, the filter 212 may be provided as a long-pass filter configured to transmit at least 95% of light within the spectral power distribution of the phosphor emission therethrough to be incident on the detector 208. In various embodiments, the filter 212 may be a long-pass filter configured to cut out all or most of the optical excitation response signal 120, resulting in the detector 208 only measuring the optical-excitation-independent signal 124. Optionally, no filter may be placed in the optical path above the second detector 208. Those skilled in the art will appreciate that any of a wide variety of filters may be used and the filters may be configured to pass or remove less than or greater than 95% of the incident light in various spectral ranges.

In some embodiments, the optical element 222, 220, 216, and 214 are configured to allow a first portion of the combined signal 122 to propagate to the detector 206 and to allow a second portion of the combined signal 122 to propagate to the second detector 208. In various embodiments, at least a portion of the first portion of the combined signal 122 comprises the optical excitation response signal 120 and at least a portion of the second portion of the combined signal 122 comprises the optical-excitation-independent signal 124. In various embodiments, the detector 206 is configured to receive the optical excitation response signal 120 and the second detector 208 is configured to receive the optical-excitation-independent signal 124 and, when sampled by the controller 228, the detector 206 and 208 provide signals representative of the signals they receive to the controller 228.

In other embodiments, at least a portion of the first portion of the combined signal 122 comprises the reflected signal 125 and at least a portion of the second portion of the combined signal 122 comprises the optical-excitation-independent signal 124. In various embodiments, the detector 206 is configured to receive the reflected signal 125 and the second detector 208 is configured to receive the optical-excitation-independent signal 124, and each respective detector is configured to provide these signals to the controller 228. In other embodiments, the detector 206 is configured to receive the optical-excitation-independent signal 124 and the second detector 208 is configured to receive the reflected signal 125. When sampled by the controller 228, the detector 206 and detector 208 provide signals representative of the portions of the signals that they receive to the controller 228.

Though not shown, one or more temperature sensors (thermocouples, thermistors, photodiodes, etc.) may be positioned in thermal communication with each of the detectors 206, 208 and configured to provide information regarding the temperature of the detectors 206, 208 that may be used to identify and correct for temperature-based effects. In other embodiments, the temperature sensors may be attached or integrated with the detectors 206, 208. Though not shown, one or more temperature sensors (thermocouples, thermistors, photodiodes, etc.) may be positioned in thermal communication with the controller 228 and/or within the optional housing 202 and configured to provide information regarding the temperature of the controller 228 and/or the temperature within the optional housing 202 that may be used to identify and correct for temperature-based effects of the controller or its amplification and/or processing circuits.

The embodiments described above with respect to FIGS. 5 and 6 show only a single temperature probe 100, though those skilled in the art will appreciate that in other embodiments, for example, the sensor sub-system 201 may be configured to receive a combined signal 122 from multiple temperature probes 100. In various embodiments, signals from the multiple temperature probes 100 may be differentiated in a variety of ways, either using optical switches, timing of detector sampling, and the like. In various embodiments, the multiple temperature probes may communicate only with dedicated optics and detectors in multiple channels, such as channels 240 and 242 described herein with respect to FIG. 6.

The embodiments of the sensor sub-system 201 described above with respect to FIGS. 5 and 6 use mirrors and filters to select the wavelengths or wavelength ranges that reach the detectors. In various embodiments, a variety of optical instruments may be used to measure properties of the combined signal 122. In such embodiments, the need for higher measurement fidelity (e.g., as may be required to control the process temperature of the various semiconductor manufacturing processes) may require additional information about the combined signal 122 (such as optical power and wavelength). In various embodiments, the optical power spectrum of the radiation from the sensing element 118 (whether provided as a thermographic phosphor or a band-gap-type sensing material, or other sensor types) may carry this additional information about any one of the optical excitation response signal 120, the optical-excitation-independent signal 124, and the reflected signal 125 that can best be measured at finer resolution. For example, the optical power spectrum of a phosphor sensing element may change with temperature and enhanced measurement fidelity may be required to characterize this effect. In various embodiments, the reflected signal 125 may be analyzed as a function of wavelength to determine the change in cut-off wavelength of the bandgap type sensing element, which may then be used to determine an object temperature.

FIG. 7 shows a schematic view of an embodiment of a temperature sensor system 300 configured to measure one or more spectral properties of the combined signal 122 received from the temperature probe 100 via at least one optical path 250. In various embodiments, the temperature sensor system 300 may include a sensor sub-system 201 that may include a light source module 215, an optical analysis module 340, and a measurement module 360. In various embodiments, the optical analysis module 340 may be operative to separate the signals 120, 124, 125, and 122 received from the temperature probe 100 into one or more wavelength components to be measured by the measurement module 360 to provide enhanced measurement fidelity, for example, to determine the change in the cut-off wavelength of a band-gap-type sensor or to at least partially separate the combined signal 122 into discrete wavelength components. For example, the black-body radiation spectrum changes with temperature as discussed herein with reference to FIG. 4, and a spectrally-detailed measurement of the black-body radiation spectrum may be used to discern which portions of the combined signal 122 comprise black-body radiation. In various embodiments, a spectrometer, spectrograph, or monochromator may be used to measure all the spectral properties at finer resolution or at additional spectral windows than may be achieved with a single detector or multiple detectors.

The light source module 215 may include a light source 218, an optical element 220, and at least a portion of the optical path 250. In various embodiments, the light source 218 may be operative to emit at least one optical excitation signal 130 or at least one illumination signal 140 configured to propagate toward the optical element 220 which may be configured to direct the optical excitation signal 130 or the illumination signal 140 to the optical path 250. In various embodiments, the optical path 250 is configured to allow the optical excitation signal 130 or the illumination signal 140 to propagate to the temperature probe 100 and to the sensing element 118 positioned in thermal communication with the object to be measured. The optical path 250 is also configured to allow at least a portion of the combined signal 122 to propagate from the temperature sensing device 100 to the optical analysis module 340. In various embodiments, the light source 218 may be provided as an LED or a laser, and the optical element 220 may direct the optical excitation signal 130 to the optical path 250, for example, for measurements using thermographic phosphors. In various embodiments, the light source 218 may be provided as a broadband or white light source and the optical element 220 may direct the illumination signal 140 to the optical path 250, for example, for band-gap-type measurements. When the sensing element 118 is provided as a band-gap-type sensing material, the sensing element 118 may be configured to reflect the illumination signal 140 as at least one reflected signal 125 (as also described herein with respect to FIG. 2) as part of a combined signal 122 that may include at least one optical-excitation-independent signal 124 emitted by the surfaces of the temperature probe 100. In various embodiments, the combined signal 122 may comprise at least a portion of the reflected signal 125 and at least a portion of at least one optical-excitation-independent signal 124. When the sensing element 118 is provided as a thermographic phosphor, the sensing element 118 may be configured to emit at least one optical excitation response signal 120 as part of a combined signal 122 that may include at least one optical-excitation-independent signal 124 emitted by the surfaces of the temperature probe 100. In various embodiments, the combined signal 122 may comprise at least a portion of the optical excitation response signal 120 and at least a portion of at least one optical-excitation-independent signal 124. The optical path 250 may be configured to allow at least a portion of the combined signal 122 to propagate from the temperature probe 100 to the optical analysis module 340.

In the illustrated embodiment, the optical analysis module 340 may be provided as a Czerny-Turner monochromator configured to receive at least a portion of the combined signal 122 and to separate the combined signal 122 into individual wavelength components. Optionally, the optical analysis module 340 may be provided as any of a variety of monochromators, spectrographs, spectrometers, and the like. In various embodiments, the optical analysis module 340 may include an optional housing 342 having at least one entrance port 344 and at least one exit port 346 formed therein. In various embodiments, at least one first concave mirror 348, at least one planar diffraction grating 350, and at least one second concave mirror 352 may be positioned within the housing 342. In various embodiments, the combined signal 122 propagating from the temperature probe 100 may propagate through the optical element 220 and into the entrance port 344 of the optical analysis module 340, shown as individual rays 322. In various embodiments, the first concave mirror 348 may direct the rays 322 to the diffraction grating 350 that may then diffract the rays 322 into individual wavelength components 324 that may then be directed by the second concave mirror 352 and through the exit port 346 and into the measurement module 360.

In various embodiments, the measurement module 360 may include a receiver 362 having a plurality of spatially-arrayed receiver ports 364, wherein each receiver port 364 may include at least one detector 366 operative to measure the power and/or wavelength of respective wavelength components 324. In various embodiments, a plurality of waveguides 368 may be positioned in optical communication with the exit port 346, wherein each waveguide 368 may be configured to allow each of the wavelength components 324 to propagate therethrough to corresponding detectors 366 of the receiver 362. While FIG. 7 shows four receiver ports 364, four detectors 366, and four waveguides 368, those skilled in the art will appreciate that the measurement module 360 may include any number of receiver ports, detectors, and waveguides. In the illustrated embodiment, the measurement module 360 also includes a power supply 376, a controller 378, and an optional display 380 in communication with the receiver 362 via a communication link 374. Optionally, the receiver 362 may include at least one wireless transmitter 370 configured to emit at least one wireless signal 372 to the controller 378 or a separate controller, processor, and/or optional display (not shown). Optionally, and not shown in FIG. 7, the controller 378 may be configured to provide a wired or wireless signal to additional equipment. In various embodiments, the controller 378 may be provided as the controller 228 described above with respect to FIGS. 5 and 6. In various embodiments, the reflected light signal 125 may be analyzed as a function of wavelength to determine the change in cut-off wavelength of the band-gap-type sensing element, which may then be used to determine an object temperature.

The optical analysis module 340 is configured to receive the combined signal 122 from the temperature sensing device 100, and to separate the combined signal 122 into a plurality of discrete wavelength components 324 propagating to the plurality of detectors 366, wherein each of the plurality of detectors 366 corresponds to at least one of the plurality of discrete wavelength components 324, wherein each of the plurality of detector 366 is configured to provide at least one signal representative of the corresponding wavelength components 324 to the controller 378. When the sensing element 118 is provided as a thermographic phosphor, the controller 378 is configured to separate the signal representative of each of the plurality of discrete wavelength components 324 into at least one signal representative of the optical excitation response signal 120 and at least one signal representative of the optical-excitation-independent signal 124. In various embodiments, the characteristic of the optical excitation response signal 120 comprises an intensity decay rate of the optical excitation response signal 120 or an intensity at of least one wavelength of the optical excitation response signal 120. In various embodiments, the characteristic of the optical-excitation-independent signal 124 comprises an intensity of black-body radiation or an intensity at one wavelength of black-body radiation. The controller 368 is configured to calculate at least one object temperature based on at least one of the characteristic of the optical excitation response signal 120 and the characteristic of the optical-excitation-independent signal 124. In other embodiments, when the sensing element 118 is provided as a band-gap-type sensing element, the controller 378 is configured to separate the signal representative of each of the plurality of discrete wavelength components 324 into at least one signal representative of the reflected signal 125 and at least one signal representative of the optical-excitation-independent signal 124. The controller 368 is configured to calculate at least one object temperature based on at least one of the characteristic of the reflected signal 125 and the characteristic of the optical-excitation-independent signal 124.

In various embodiments, the sensor systems 200 and 300 disperse and measure the intensity of the combined signal 122 across more than one wavelength band. As temperature increases, the cut-off wavelength of a band-gap-type sensing element increases such that the intensity of the reflected signal 125 is relatively low at wavelengths below the cut-off wavelength and relatively high at wavelengths above the cut-off wavelength. The relative intensity of the light measured in the various wavelength bands may be determined and related to a cut-off wavelength of a band-gap-type sensing element 118 using a formula, a look up table, or other means in order to determine an object temperature. In various embodiments, the wavelength bands may measure discrete spectral components of the combined signal 122. In various embodiments, the wavelength band associated with the detector 206 may overlap with the wavelength band associated with the detector 208 or other detectors. For example, overlapping wavelength bands may be formed using an optical element 220 (or 216) (e.g., a filter) that has a gradual cut-off wavelength such that light from the combined signal 122 may be incident on both detectors 206 and 208, or other detectors. An overlapping wavelength band increases the wavelength range over which the sensor system 200 or 300 can measure cut-off wavelength of the band-gap-type sensing element with a limited number of detectors. In various embodiments, the measurement of the cut-off wavelength may be related to an object temperature using a formula, a look up table, or other means in order to determine an object temperature. The optical-excitation-independent signal 124 may be measured independently of the reflected signal 125 when the illumination signal 140 is turned off. As object temperature increases, the intensity of the optical-excitation-independent signal 124 increases, and the increased intensity occurs especially at lower wavelengths in accordance with Planck's law as described elsewhere herein. The relative intensity of the signals measured at multiple wavelength bands may be determined and related to an object temperature associated with the optical-excitation-independent signal 124 using a formula, a look up table, or other means. For example, the spectrum of the optical-excitation-independent signal 124 may be compared to the spectrum at a temperature calculated using Planck's law. By measuring the relative intensities of portions of the spectrum of the combined signal 122 at various temperatures, the object temperature may be determined from either or both of the reflected signal 125 and the optical-excitation-independent signal 124.

Figure 8:
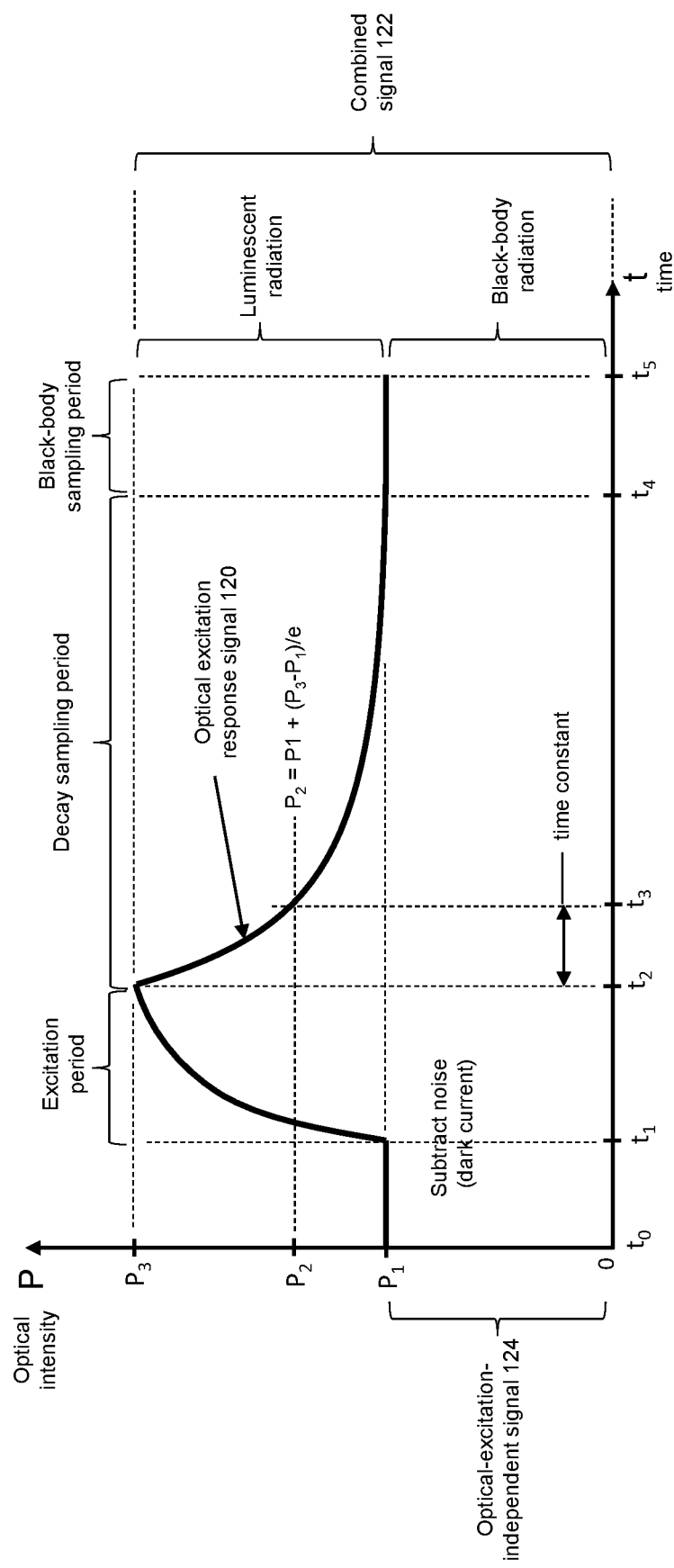
FIG. 8 shows a timing diagram of an operational embodiment of an exemplary temperature sensor system.

FIG. 8 shows an exemplary timing diagram of an operational embodiment of the sensor system 200 or 300 that depicts timing of excitation of the phosphor sensing element 118 by the optical excitation signal 130, followed by periods for sampling the detector(s) 206/208/366 (also referred to herein as "the detector") to measure the combined signal 122. The horizontal axis is time, t, and the vertical axis is the optical intensity, P, of the combined signal 122 incident on the detector during various sampling periods. The relative signal levels shown in FIG. 8 are not necessarily shown to scale. In the illustrated embodiment, at time to, the combined signal 122 incident on the detector consists solely of the optical-excitation-independent signal 124, for example, coupled black-body radiation 124, having an intensity $P_1$. During an "excitation period" from time $t_1$ to time $t_2$, the controller 228/378 (also referred to herein as "the controller") commands the light source 218 to emit the optical excitation signal 130 to excite the phosphor sensing element 118, which begins to phosphoresce upon receiving the optical excitation signal 130, emitting an optical excitation response signal 120. As such, from $t_1$ to $t_2$, the combined signal 122 includes both the optical excitation response signal 120 and the optical-excitation-independent signal 124, adding to intensity $P_3$ at the end of the excitation period at $t_2$. The optical excitation response signal 120 increases as the phosphor sensing element 118 becomes excited. The duration of the excitation period is chosen so that the sensing element 118 reaches a sufficient level of excitation. In various embodiments, sufficient excitation may mean that the emission level of the phosphor saturates, however this is not a limitation of the present disclosure, and in other embodiments the emission level of the phosphor may not be fully saturated. In various embodiments, saturation depends on the type of phosphor chosen, the temperature and excitation conditions, among other parameters. The excitation period ends at time $t_2$ (e.g., when the optical excitation signal 130 is turned off), and a "decay sampling period" begins, wherein the phosphor sensing element 118 emits the optical excitation response signal 120 that decays at a rate related to its temperature. At time $t_3$, the intensity of the optical excitation response signal 120 has decayed to a value of about 1/e times the difference between the maximum intensity $P_3$ and the intensity $P_1$ of the optical-excitation-independent signal 124, so the period of time from $t_2$ to $t_3$ is one time constant (defined elsewhere herein). This brings the total intensity incident on the detector (e.g., any of the detectors 206, 208, and 366) down to intensity $P_2$ at time $t_3$. In the illustrated embodiment, the decay sampling period ends at time $t_4$, when the optical excitation response signal 120 has decayed to below a functionally detectable level or to an operationally low enough level, for example, bringing the total intensity incident on the detector 206 down to or close to $P_1$. At time $t_4$, because the optical excitation response signal 120 has decayed below a functionally detectable or an operationally detectable level, the combined signal 122 predominantly comprises the optical-excitation-independent signal 124 (in this case, only black-body radiation), and a "black-body sampling period" begins, that lasts until time t5. After time to, the excitation period, the decay sampling period and the black-body sampling period may be repeated as desired. In various embodiments, these periods may be repeated in the same order for the same durations. In other embodiments, these periods may be repeated in the same order but for different durations. In other embodiments, these periods may be repeated in a different order. Those skilled in the art will appreciate that these periods may be executed in any order for any duration.

Figure 9:
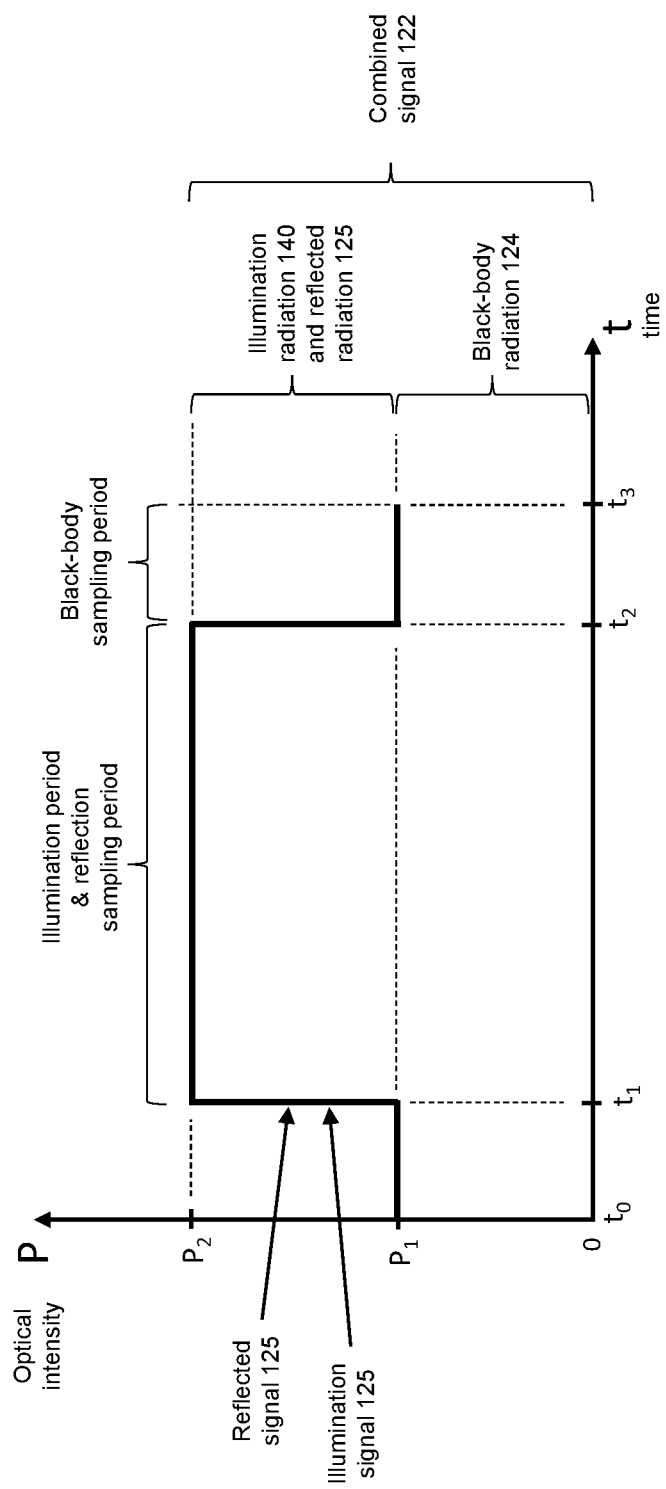
FIG. 9 shows a timing diagram of an alternate operational embodiment of an exemplary temperature sensor system.

FIG. 9 shows an exemplary timing diagram of an operational embodiment of the sensor system 200 or 300 that depicts timing of illumination of the sensing element 118 by the illumination signal 140 (e.g., when the sensing element 118 is provided as a band-gap-type sensing material as described herein). The horizontal axis is time, t, and the vertical axis is the optical intensity, P, of the combined signal 122 incident on the detector (e.g., any of the detectors 206, 208, and 366) during various sampling periods. The relative signal levels shown in FIG. 9 are not necessarily shown to scale. At time to, the combined signal 122 incident on the detector comprises only the optical-excitation-independent signal 124 (black-body radiation, for example). During an "illumination period" from time $t_1$ to time $t_2$, the light source 218 emits the illumination signal 140 that reflects from the band-gap-type sensing element 118 as a reflected signal 125 having an intensity $P_2-P_1$. As such, the time from $t_1$ to $t_2$ is also a "reflection sampling period" wherein the detector is sampled as the reflected signal 125 is incident thereon. As such, from $t_1$ to $t_2$, the combined signal 122 includes both an optical-excitation-independent signal 124 and the reflected signal 125. At time $t_2$, the illumination signal 140 is turned off, thereby ending both the illumination period and the reflection sampling period. At time $t_2$, because the illumination signal 140 is off, the combined signal 122 predominantly comprises the optical-excitation-independent signal 124 (in this case, only black-body radiation), and a "black-body sampling period" begins, lasting until time $t_3$. After time $t_3$, the black-body sampling period may continue, or the illumination period, the reflection sampling period, and the black-body sampling period may be repeated as desired. In various embodiments, these periods may be repeated in the same order for the same durations. In other embodiments, these periods may be repeated in the same order but for different durations. In still other embodiments, these periods may be repeated in a different order. Those skilled in the art will appreciate that these periods may be executed in any order for any duration.

During the various excitation/illumination/sampling periods described above, the detector (e.g., any of the detectors 206, 208, and 366), when sampled by the controller (e.g., the controllers 228 or 378) are configured to provide at least one signal representative of the combined signal 122 to the controller. When the sensing element 118 is provided as a thermographic phosphor, the controller is configured to separate the signal representative of the combined signal 122 into at least one signal representative of the optical excitation response signal 120 and at least one signal representative of the optical-excitation-independent signal 124. When the sensing element 118 is provided as a band-gap-type sensing material, the controller is configured to separate the signal representative of the combined signal 122 into at least one signal representative of the reflected signal 125 and at least one signal representative of the optical-excitation-independent signal 124.

The embodiments of the sensor system 200 and the sensor system 300 described herein with respect to FIGS. 2-3 and FIGS. 5-9 may be used to perform a variety of measurements using methods that leverage the capability of calculating an object temperature based on a combined signal by separating the combined signal into individual signals. In some embodiments, the method includes detecting a first type of combined signal 122 (e.g., by sampling one or more detectors) and separating it into at least one signal representative of the optical excitation response signal 120 and one signal representative of the optical-excitation-independent signal 124, wherein the signal representative of the optical excitation response signal 120 comprises at least one characteristic of an optical excitation response signal 120 (e.g., from a thermographic phosphor) and the signal representative of the optical-excitation-independent signal 124 comprises at least one characteristic of an optical-excitation-independent signal 124 (e.g., a black-body radiation signal) and processing these characteristics to calculate an object temperature result. In various embodiments, the characteristic of the optical excitation response signal 120 is an intensity decay rate and the characteristic of the optical-excitation-independent signal 124 is an intensity of black-body radiation. In other embodiments, the characteristic of the optical excitation response signal 120 is an intensity of one wavelength, and the characteristic of the optical-excitation-independent signal 124 is an intensity of one wavelength of black-body radiation. In various embodiments, the controllers 228 or 378 (also referred to herein as "the controller") may be configured to calculate at least one object temperature based on at least one characteristic of the optical excitation response signal 120 and at least one characteristic of the optical-excitation-independent signal 124. Other characteristics of the signals representative of the optical excitation response signal 120 and the optical-excitation-independent signal 124 may include the return power or phase shift of the optical excitation response signal 120, reflection during the optical excitation period, the rise time constant during excitation, and the various signals (relative or absolute) or portions thereof, at or within certain wavelength bands.

In other embodiments, the method may include detecting a second type of combined signal 122 (e.g., by sampling one or more detectors) and providing a signal representative of the combined signal 122 to the controller, wherein the controller is configured to separate the signal representative of the combined signal 122 into at least one signal representative of the reflected signal 125 and at least one signal representative of the optical-excitation-independent signal 124. In various embodiments, the controller may be configured to calculate at least one object temperature based on at least one characteristic of the optical-excitation-independent signal 124 and at least one characteristic of the reflected signal 125. In some embodiments, the signal representative of the optical-excitation-independent signal 124 comprises at least one first characteristic of the signal representative of the optical-excitation-independent signal 124, and the signal representative of the reflected signal 125 comprises at least one second characteristic of the signal representative of reflected signal 125. In some embodiments, the first characteristic is different from the second characteristic. In other embodiments, the first characteristic is the same as the second characteristic. In various embodiments, at least one of the first characteristic or the second characteristic comprises at least one of a wavelength, an intensity or amplitude, an optical power spectrum, or one or more portions of an optical power spectrum.

Figure 10:
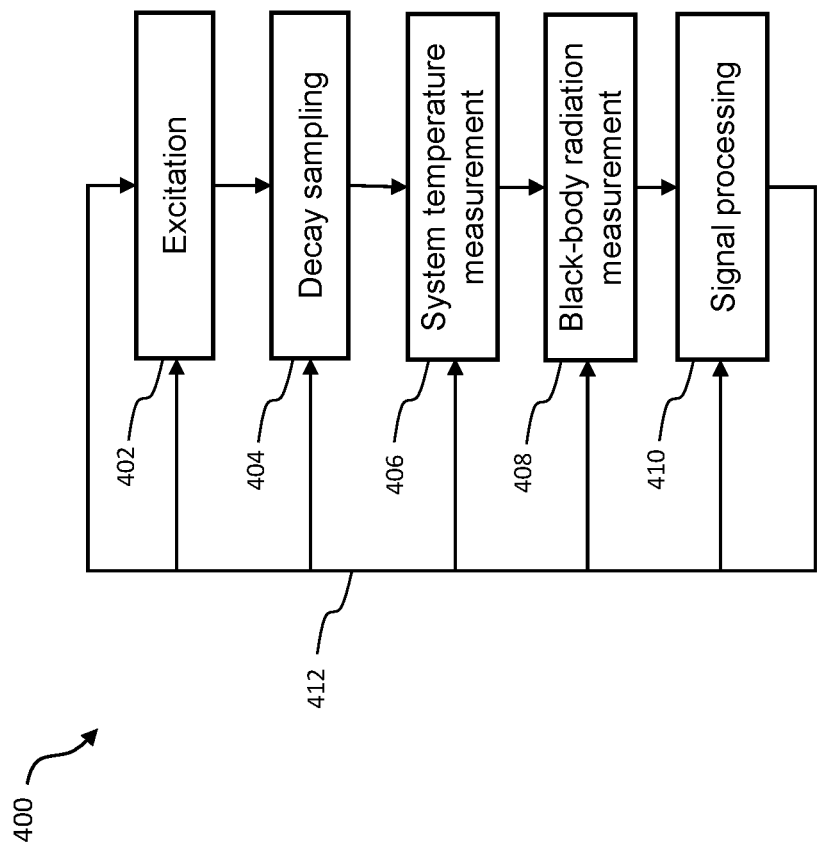
FIG. 10 shows a flowchart of an embodiment of a measurement method operative to use embodiments of exemplary temperature sensor systems to measure an object temperature.

FIG. 10 shows an exemplary process flowchart 400 of an embodiment of a measurement method operative to use at least one of the sensor systems 200 or 300 to measure an object temperature. While in the illustrated embodiment, the process flowchart 400 has five steps, those skilled in the art will appreciate that in other embodiments fewer, or more steps may be included and/or the steps may occur in different orders. The first step, an "excitation step" 402 is performed, wherein the light source 218 emits an excitation signal 130 for an excitation period (e.g., as described above with respect to FIG. 8) so that the sensing element 118 reaches a sufficiently high level of excitation and emission. When the excitation period has ended, the light source 218 is turned off. The duration of the excitation period depends on the specific temperature sensor system configuration, the object temperature range to be measured, the specific phosphor, and the like. In various embodiments, the duration of the excitation period may be in the range of about 1 ms to about 20 ms, however the duration of the excitation period is not a limitation of the present disclosure. Information regarding the excitation step 402 (such as signal intensity, duration, wavelength, and the like) may be sent to and stored in the controller. At least one combined signal 122 (including at least one optical excitation response signal 120 and at least one optical-excitation-independent signal 124) propagates from the temperature probe 100 through the optical path 250 to at least one of the detector 206 and the detector 208, or the optical analysis module 340.

After the excitation step 402, a "decay sampling" step 404 may be performed, wherein the combined signal 122 is measured by sampling the detector repeatedly during the decay sampling period (e.g., as described above with respect to FIG. 8). In the illustrated embodiment, the detector by itself may not be able to discern what portion of the combined signal 122 is the optical excitation response signal 120 and the optical-excitation-independent signal 124 (and/or the reflected signal 125). As such, during the decay sampling period, the detector is detecting the decay rate of the combined signal 122. In various embodiments, the sampling may also include an optional amplification step performed on the sampled signals to increase their signal levels. In various embodiments, the sampling may be done in the analog domain or may be performed using an analog-to-digital (ADC) converter to convert the decay signal to the digital domain. In various embodiments, the peak intensity of the combined signal 122 may be in the range of about 0.1 nanowatt to about 10,000 nanowatts, however the signal power is not a limitation of the present disclosure. Example sampling parameters may include, without limitation, the sampling frequency (the time elapsed between samples) and the number of samples. In various embodiments, the sampling frequency may be selected to achieve a sufficiently high resolution for calculation of the time constant. In various embodiments, the sampling frequency may be chosen to provide at least 3 samples in the period of one time constant, at least 10 samples in the period of one time constant, at least 50 samples in the period of one time constant, at least 100 samples in the period of one time constant, or at least 400 or more samples in the period of one time constant. Samples may be collected over a period of up to one time constant or over several time constants. Samples may also be collected over a fixed period, typically between about 1 ms and about 100 ms, or over a variable period that may vary based on one or more characteristics or parameters measured or calculated during the excitation step 402 (for example, the intensity of the optical excitation signal 130, the rise time of the optical excitation signal 130, or the like), during this decay sampling step 404 or during a previous decay sampling step 404, or some other characteristic of the combined signal 122. The values of these sampling parameters can be chosen to suit a particular measurement application. In various embodiments, at least one signal representative of the intensity decay rate of the combined signal 122 may be sent to and stored in the controller.

After completing the decay sampling step 404, the next step may be an optional "system temperature measurement" step 406, wherein a system temperature of the detectors 206, 208, or 366 (also referred to herein as "the detector"), an area near the detectors, and/or areas near the controller may be measured by sampling the temperature sensor mounted in thermal communication therewith (as described herein) while simultaneously sampling the detector(s) themselves. A parameter characteristic of the dark current of the detector(s) (also referred to herein as a "dark current parameter") may be calculated, as may a signal characteristic of the temperature of the controller. In other embodiments, the system temperature measurement step 406 may involve sampling a second (unexcited) photodetector in thermal communication with the detector while simultaneously sampling the detector. The system temperature of the detector is at least in part used to determine the dark current of these detectors. Because the dark current of the detector affects its reading when sampled, the object temperature is at least in part determined by correcting for the dark current of the detector.

Optionally, this system measurement step 404 may comprise consulting a lookup table based on the known characteristics of the detector, either based on product information or a prior calibration of the detector or the temperature of controller. In various embodiments, the system temperature measurement step 406 may occur at a detector temperature measurement sampling rate throughout the process 400, providing information on the detector temperature at each step in the process and/or at various intervals within one or more steps in the process. In various embodiments, the system temperature measurement step may occur at times other than the decay sampling period.

After completing the system temperature measurement step 406, the next step may be a black-body radiation measurement step 408 wherein the optical-excitation-independent signal 124 may be measured by sampling the detector. In various embodiments, this sampling may also include an optional amplification step to increase the signal level. In various embodiments, the sampling may be done in the analog domain or may be performed using an analog-to-digital (ADC) converter to convert the decay signal to the digital domain. The data representative of the optical-excitation-independent signal 124 measurement may be communicated to and stored in the controller. The data representative of the optical-excitation-independent signal 124 can then be subtracted from the data representative of the combined signal 122.

In various embodiments, the steps may be repeated for second, third, and subsequent measurements commanded by an iterative loop 412. In addition, any of the steps 402 through 408 may be repeated by use of the same iterative loop 412. Those skilled in the art will appreciate that that the order of the steps 402 through 408 may be changed as required.

After measurements of the combined signal 122 are compiled, the controller may execute a signal processing step 410, for example, to calculate an object temperature value. In various embodiments, the time constant of the optical excitation response signal 120 may be calculated using the decay rate data compiled from sampling the detector during the decay sampling step 404 as described above. In various embodiments, the time constant may then be compared to known data of the time constant (e.g., from a lookup table or other reference containing the known properties of the thermographic phosphor used) relative to temperature (e.g., wherein the lookup table or other reference may be stored in the memory of the controller). This comparison may be used to calculate the object temperature associated with the optical excitation response signal 120 once the optical-excitation-independent signal 124 has been subtracted from the measurement of the combined signal 122.

In various embodiments, the dark current parameter calculated in the system measurement step 406 may be subtracted from the black-body signal measurement in step 408 to produce a dark-current-corrected black-body signal. In various embodiments, the dark-current-corrected black-body signal may be compared to known data of the black-body signal (e.g. from a lookup table, formula, or other reference containing a known relationship of the black-body signal to temperature) relative to temperature (e.g., wherein the lookup table, formula, or other reference may be stored in the memory of the controller). In various embodiments, this comparison may be used to calculate the object temperature associated with the optical-excitation-independent signal 124. In various embodiments, a value of at least one of the signal representative of the optical excitation response signal 120 and the signal representative of the optical-excitation-independent signal 124 is reduced by the value of the dark current of the first detector 206, the second detector 208, or the detectors 366. In various embodiments, the steps 402 through 410 may be repeated for second, third, and subsequent measurements by the iterative loop 412 as commanded by the controller. In various embodiments, any of the steps 402 through 410 may be repeated by use of the same iterative loop 412. Those skilled in the art will appreciate that that the order of the steps 402 through 410 can be changed as required or beneficial.

In various embodiments, the controller may be configured to evaluate or compare the object temperatures determined using the optical excitation independent signal 124 and those determined using the optical excitation response signal 120, as well as optionally other parameters, and report or transmit only one of the object temperature values, for example, to extend the range of the temperature measurement system beyond the operational range available using only one type of response signal. In various embodiments, the operational range may be extended above that of a system using only a phosphor based or band-gap-type based sensor, for example by only using the object temperature determined from the optical-excitation-independent-signal 124 above a specific object temperature value or when the object temperature as determined from the optical excitation response signal 120 or the reflected light signal 125 is at or above or below a specific object temperature value.

In various embodiments, various spectral characteristics of the optical excitation dependent signal 120, the optical-excitation-independent signal 124, and the reflected light signal 125, for example, as determined using the sensor system 200 or 300 or other sensor systems, may be utilized to determine the object temperature or to determine which signals to use to determine the object temperature. In various embodiments, various portions of the optical excitation dependent signal 120, the optical-excitation-independent signal 124, and the reflected light signal 125, for example, as determined using the sensor system 200 or 300 or other sensor systems, may be utilized to determine the object temperature or to determine which signals to use to determine the object temperature.

Various embodiments described above relate to measuring and characterizing the optical-excitation-independent signal 124 after the optical excitation response signal 120 has decayed (e.g., after an expected decay period). In various embodiments, the optical excitation response and optical-excitation-independent components of the combined signal 122 may be measured using other forms of excitation, such as a sine wave, a triangle wave, or any arbitrary waveform for the optical excitation signal 130. In various embodiments, the sensor systems 200 or 300 may measure the optical-excitation-independent signal 124 while the optical excitation response signal 120 is still decaying. In various embodiments, the decay rates of various thermographic phosphors as a function of temperature may be known, and the controller may include a library of this decay rate data (e.g., in non-volatile memory as a lookup table, formula, or other form) that may enable the controller to recognize the optical-excitation-independent signal 124 during the decay sampling step 404.

In various embodiments, the optical excitation response may be measured using excitation signals having different time dependencies. One time dependence is a square wave, but those skilled in the art will appreciate that the excitation signal may have other time dependencies, such as a sine wave, triangle wave, or the like. In some embodiments, the sensor system 200 may measure the optical-excitation-independent signal 124 periodically or continuously. In other embodiments, a sinusoidal excitation signal may produce a sinusoidal optical excitation response having the same or similar period as the excitation signal, but with a phase delay. In these embodiments, the phase delay of various thermographic phosphors as a function of temperature may be known, and the controller may include a library of this phase delay data (e.g., in non-volatile memory as a lookup table, formula, or in other form) that may enable determination of the object temperature from the phase delay value.

In various embodiments, the sensor systems 200 and 300 may include a temperature transition range having a minimum value and a maximum value, wherein the controllers 228/378 may be configured to use the optical excitation response signal 120 to determine the object temperature when the object temperature is below the minimum value of the temperature transition range, and to use the optical-excitation-independent signal 124 to determine the object temperature when the object temperature is above the maximum value of the temperature transition range. For example, as temperature increases, the intensity of phosphorescent radiation (e.g., comprising the optical excitation response signal 120) emitted by the thermographic phosphor may decrease with temperature, for example because of the quenching effects (as described herein). The amount of decrease in intensity or the presence of any decrease in intensity, is dependent on the phosphor material as well as the temperature range over which it is used. This decrease may contribute to the increasing dominance of black-body radiation (e.g., the optical-excitation-independent signal 124) as a portion of total radiation (e.g., the combined signal 122) received as the object temperature increases. For example, in various embodiments, the decrease in intensity of the phosphor emission above a certain temperature may result in the object temperature calculated using the optical-excitation-independent signal 124 having a lower uncertainty than the object temperature calculated using the optical emission response signal 120. In various embodiments, depending on the choice of phosphor, this temperature may be in the range of about 600° C. to about 700° C. or may be about 650° C. At lower estimated object temperatures, because the intensity of black-body radiation is known to be small (e.g., as described by Planck's law), the object temperature calculated using the optical emission response signal 120 may have lower uncertainty than the optical-excitation-independent signal 124. In various embodiments, the temperature range between about 500° C. and 650° C. may be the temperature transition range. Within this temperature transition range, a combination of the optical excitation response signal 120 and the optical-excitation-independent signal 124 may be used to calculate the object temperature. There are various ways to determine the proportions of the optical excitation response signal 120 and optical-excitation-independent signal 124 that may be used to calculate the object temperature. An object temperature determined using these proportions may be referred to as a "combined temperature".

In various embodiments, the controller may be configured to use the optical excitation response signal 120 at a second time to determine an object temperature when the object temperature is below the temperature transition range and to use the optical-excitation-independent signal 124 at a first time to determine the object temperature when the object temperature is above the temperature transition range. In various embodiments, the object temperature determined from the optical-excitation-independent signal 124 at the first time may be used to determine if the object temperature is above or below the temperature transition range. The controller may be configured to use the optical excitation response signal 120 at a second time to determine an object temperature when the object temperature is less than the minimum value of the temperature transition range, to use the optical-excitation-independent signal 124 at a first time to determine the object temperature when the object temperature is greater than the maximum value of the temperature transition range, and to use a combination of the optical excitation response signal 120 at a first time and the optical-excitation-independent signal 124 at a second time when the object temperature is within the temperature transition range.

Figure 11:
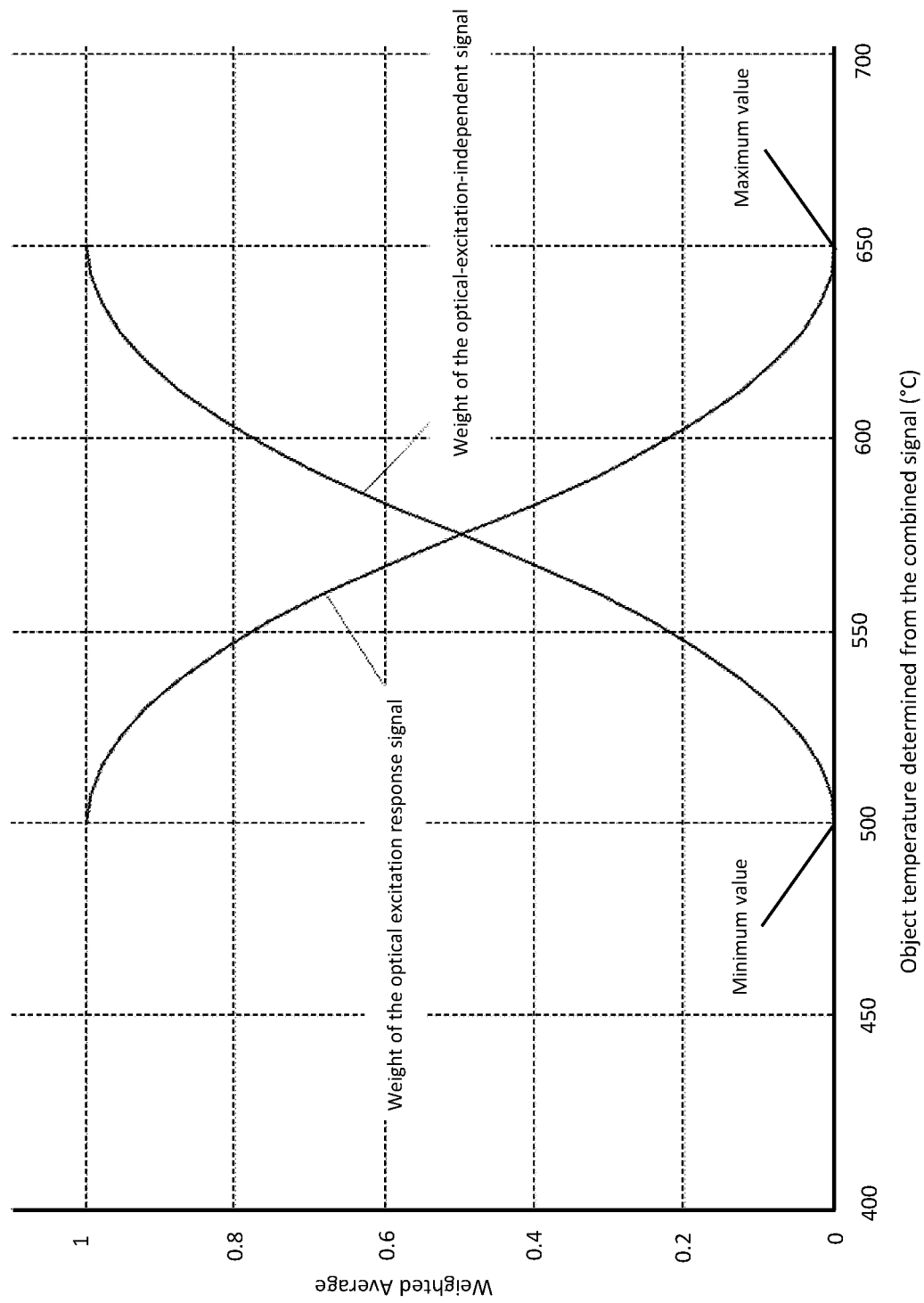
FIG. 11 shows a graph of an example embodiment of a weighting function across a temperature transition range.

FIG. 11 shows a graph of an example embodiment of a weighting function across an exemplary temperature transition range. In this embodiment, the temperature transition range has a minimum value (e.g., 500° C.) below which the combined temperature is equal to the object temperature determined from the optical excitation response signal 120, and a maximum value (e.g., 650° C.) above which the combined temperature is equal to the object temperature determined from the optical-excitation-independent signal 124. As such, in this embodiment, the temperature transition range is 150° C. (650° C. minus 500° C.). In other embodiments, the minimum value, the maximum value, (and, thereby the temperature transition range) may have any value. In some embodiments, the object temperature determined by the optical excitation response signal 120 is used to determine if the object temperature is above or below the temperature transition range. In other embodiments, the object temperature determined from the optical-excitation-independent signal 124 is used to determine if the object temperature is above or below the temperature transition range. Below the minimum value, the combined temperature may be equivalent to the object temperature determined from the optical excitation response signal 120. Above the maximum value, the combined temperature may be equivalent to the object temperature determined from the optical-excitation-independent signal 124. Within the transition range, in one embodiment, the combined temperature may be calculated using the weighting function show in FIG. 11. For example, in one embodiment, at an estimated object temperature of about 550° C., about 80% of the object temperature should be determined from the optical excitation response signal 120 and about 20% of the object temperature should be determined by the optical-excitation-independent signal 124. As such, the controller may be configured to use the optical excitation response signal 120 to determine the object temperature when the object temperature is less than the minimum of the temperature transition range, and to use the optical-excitation-independent signal 124 to determine the object temperature when the object temperature is greater than the maximum of the temperature transition range, and to use a combination of the optical excitation response signal 120 and the optical-excitation-independent signal 124 when the object temperature is within the temperature transition range.

In other embodiments, the combined temperature within the temperature transition range may be calculated based on a weighted average, expressed as:

$$T_c = (T_{120} * W_{120} + T_{124} * W_{124})/(W_{120} + W_{124})$$

wherein $T_c$ is the combined temperature, $T_{120}$ is the object temperature determined by the optical excitation response signal 120, $W_{120}$ is the weight of the optical excitation response signal 120, $T_{124}$ is the object temperature determined by the optical-excitation-independent signal 124, and $W_{124}$ is the weight of the optical-excitation-independent signal 124. In various embodiments, the weight of each temperature component may be a pre-set function that depends on the object temperature determined from the optical excitation response signal 120. In other embodiments, the weights for the weighted average may be stored in a look up table. In still other embodiments, the weighted average may be a function of the relative stability, relative power or other characteristic calculated during use of the optical excitation response signal 120 and the optical-excitation-independent signal 124. In various embodiments, other forms of weighting to calculate the combined temperature may be applied.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described herein are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present application should, therefore, be determined by the following claims, with equivalents of the claims to be included therein.

What is claimed is:

1. A temperature sensor system (200), comprising:
   at least one light source (218) configured to emit at least one optical excitation signal (130);
   at least one temperature sensing device (100) including at least one sensing element (118) in thermal communication with at least one object to be measured, wherein the at least one sensing element (118) is configured to emit at least one optical excitation response signal (120) and the at least one temperature sensing device (100) is configured to emit at least one first combined signal (122) comprising at least a portion of the at least one optical excitation response signal (120) and at least one optical-excitation-independent signal (124);
   at least one first detector (206) configured to receive at least a portion of the at least one first combined signal (122);
   at least one optical path (250) configured to allow the at least one optical excitation signal (130) to propagate to the at least one sensing element (118) and to allow at least a portion of the at least one first combined signal (122) to propagate from the at least one temperature sensing device (100) to the at least one first detector (206); and
   at least one controller (228/378),
   wherein:
   (i) the at least one first detector (206) is configured to provide at least one signal representative of the at least one first combined signal (122) to the at least one controller (228/378),
   (ii) the at least one controller (228/378) is configured to separate the at least one signal representative of the at least one first combined signal (122) into at least one signal representative of the at least one optical excitation response signal (120) and at least one signal representative of the at least one optical-excitation-independent signal (124).

2. The temperature sensor system (200) of claim 1, wherein the at least one controller (228/378) is configured to calculate an object temperature based on at least one of the at least one signal representative of the at least one optical excitation response signal (120) and the at least one signal representative of the at least one optical-excitation-independent signal (124).

3. The temperature sensor system (200) of claim 1, wherein:
   (i) the at least one signal representative of the at least one optical-excitation-independent signal (124) comprises at least one first characteristic of the at least one signal representative of the at least one optical-excitation-independent signal (124); and
   (ii) the at least one signal representative of the at least one optical excitation response signal (120) comprises at least one second characteristic of the at least one signal representative of the at least one optical excitation response signal (120).

4. The temperature sensor system (200) of claim 3, wherein at least one of the first characteristic or the second characteristic comprises at least one of an intensity or amplitude, a change in intensity or amplitude over a time period, an intensity decay rate, an optical power spectrum, or one or more portions of an optical power spectrum.

5. The temperature sensor system (200) of claim 4, wherein the at least one controller (228/378) is configured to calculate an object temperature based on at least one of the at least one first characteristic of the at least one signal representative of the at least one optical-excitation-independent signal (124) and the at least one second characteristic of the at least one signal representative of the at least one optical excitation response signal (120).

6. The temperature sensor system (200) of claim 5, wherein the at least one first characteristic of the at least one signal representative of the at least one optical-excitation-independent signal (124) comprises an intensity of black-body radiation.

7. The temperature sensor system (200) of claim 5, wherein the at least one first characteristic of the at least one signal representative of the at least one optical-excitation-independent signal (124) comprises an intensity of at least one wavelength of black-body radiation.

8. The temperature sensor system (200) of claim 5, wherein the at least one second characteristic of the at least one signal representative of the at least one optical excitation response signal (120) comprises an intensity decay rate of the at least one optical excitation response signal (120).

9. The temperature sensor system (200) of claim 5, wherein the at least one second characteristic of the at least one signal representative of the at least one optical excitation response signal (120) comprises an intensity of at least one wavelength of the at least one optical excitation response signal (120).

10. The temperature sensor system (200) of claim 2, further comprising a first temperature measuring device configured to measure a system temperature of the at least one first detector (206), wherein:
   (i) the system temperature of the at least one first detector (206) is at least in part used to determine at least one value of the dark current of the at least one detector (206); and
   (ii) the object temperature is at least in part determined by the dark current of the at least one detector (206).

11. The temperature sensor system of claim 10, wherein a value of at least one of the at least one signal representative of the at least one optical excitation response signal (120) and the at least one signal representative of the at least one optical-excitation-independent signal (124) is reduced by the at least one value of the dark current of the at least one first detector (206).

12. The temperature sensor system of claim 2, further comprising a temperature transition range, wherein the controller (228/378) is configured to use the at least one optical excitation response signal (120) to determine the object temperature when the object temperature is below the temperature transition range and to use the at least one optical-excitation-independent signal (124) to determine the object temperature when the object temperature is above the temperature transition range.

13. The temperature sensor system (200) of claim 12, wherein the object temperature determined from the at least one optical-excitation-independent signal (124) is used to determine if the object temperature is above or below the temperature transition range.

14. The temperature sensor system (200) of claim 2, further comprising a temperature transition range, wherein the controller (228/378) is configured to use the at least one optical excitation response signal (120) to determine the object temperature when the object temperature is less than the minimum of the temperature transition range, and to use the at least one optical-excitation-independent signal (124) to determine the object temperature when the object temperature is greater than the maximum of the temperature transition range, and to use a combination of the at least one optical excitation response signal (120) and the at least one optical-excitation-independent signal (124) when the object temperature is within the temperature transition range.

15. A temperature sensor system (200), comprising:
   at least one light source (218) configured to emit at least one optical excitation signal (130);
   at least one temperature sensing device (100) including at least one sensing element (118) in thermal communication with at least one object to be measured, wherein the at least one sensing element (118) is configured to emit at least one optical excitation response signal (120) and the at least one temperature sensing device (100) is configured to emit at least one first combined signal (122) comprising at least a portion of the at least one optical excitation response signal (120) and at least one optical-excitation-independent signal (124);
   at least one first detector (206) configured to receive at least a portion of the at least one first combined signal (122);
   at least one optical path (250) configured to allow the at least one optical excitation signal (130) to propagate to the at least one sensing element (118) and to allow at least a portion of the at least one first combined signal (122) to propagate from the at least one temperature sensing device (100) to the at least one first detector (206); and
   at least one controller (228/378),
   wherein the temperature sensor system (200) is configured to:
      (i) determine at least one signal representative of the at least one optical-excitation-independent signal (124) at a first time,
      (ii) determine at least one signal representative of the at least one optical excitation response signal (120) at a second time that is different from the first time, and
      (iii) calculate an object temperature based on at least one of the at least one signal representative of the at least one optical-excitation-independent signal (124) determined at the first time and the at least one signal representative of the at least one optical excitation response signal (120) determined at the second time.

16. The temperature sensor system (200) of claim 15, wherein:
   (i) the at least one signal representative of the at least one optical-excitation-independent signal (124) at the first time comprises at least one first characteristic of the at least one signal representative of the at least one optical-excitation-independent signal (124) at the first time, and
   (ii) the at least one signal representative of the at least one optical excitation response signal (120) at the second time comprises at least one second characteristic of the at least one signal representative of the at least one optical excitation response signal (120) at the second time.

17. The temperature sensor system (200) of claim 16, wherein at least one of the at least one first characteristic or the at least one second characteristic comprises an intensity or amplitude, a change in intensity or amplitude over a time period, an intensity decay rate, an optical power spectrum, or one or more portions of an optical power spectrum.

18. The temperature sensor system (200) of claim 17, wherein the at least one controller (228/378) is configured to calculate an object temperature based on at least one first characteristic of the at least one signal representative of the at least one optical-excitation-independent signal (124) at the first time and at least one second characteristic of the at least one signal representative of the at least one optical excitation response signal (120) at the second time.

19. The temperature sensor system (200) of claim 18, wherein the at least one first characteristic of the at least one signal representative of the at least one optical-excitation-independent signal (124) at the first time comprises an intensity of black-body radiation.

20. The temperature sensor system (200) of claim 18, wherein the at least one first characteristic of the at least one signal representative of the at least one optical-excitation-independent signal (124) at the first time comprises an intensity of at least one wavelength of black-body radiation.

21. The temperature sensor system (200) of claim 18, wherein the at least one second characteristic of the at least one signal representative of the at least one optical excitation response signal (120) at the second time comprises an intensity decay rate of the at least one optical excitation response signal (120).

22. The temperature sensor system (200) of claim 18, wherein the at least one second characteristic of the at least one signal representative of the at least one optical excitation response signal (120) at the second time comprises an intensity of at least one wavelength of the at least one optical excitation response signal (120).

23. The temperature sensor system (200) of claim 15, further comprising a first temperature measuring device configured to measure a temperature of the at least one detector (206), wherein:
(i) the temperature of the at least one detector (206) is at least in part used to determine the dark current of the at least one detector (206) and
(ii) the object temperature is at least in part determined by correcting for the dark current of the at least one detector (206).

24. The temperature sensor system (200) of claim 15, further comprising a temperature transition range, wherein the at least one controller (228/378) is configured to use the at least one optical excitation response signal (120) at a second time to determine an object temperature when the object temperature is below the temperature transition range and to use the at least one optical-excitation-independent signal (124) at a first time to determine the object temperature when the object temperature is above the temperature transition range.

25. The temperature sensor system (200) of claim 24, wherein the object temperature determined from the at least one optical-excitation-independent signal (124) at the first time is used to determine if the object temperature is above or below the temperature transition range.

26. The temperature sensor system (200) of claim 15, further comprising a temperature transition range having a minimum value and a maximum value, wherein the at least one controller (228/378) is configured to use the at least one optical excitation response signal (120) at a second time to determine an object temperature when the object temperature is less than the minimum value of the temperature transition range, to use the at least one optical-excitation-independent signal (124) at a first time to determine the object temperature when the object temperature is greater than the maximum value of the temperature transition range, and to use a combination of the at least one optical excitation response signal (120) at a first time and the at least one optical-excitation-independent signal (124) at a second time when the object temperature is within the temperature transition range.

27. The temperature sensor system (200) of claim 1, wherein at least a portion of an interior surface of at least one component of the at least one temperature sensing device (100) has an emissivity less than 0.70.

28. The temperature sensor system (200) of claim 1, wherein at least a portion of an interior surface of at least one component of the at least one temperature sensing device (100) has an emissivity less than 0.30.

29. The temperature sensor system (200) of claim 1, wherein the optical path (250) comprises an optical fiber.

30. The temperature sensor system (200) of claim 29, wherein the optical fiber has a first end and a second end opposite the first end, and the second end is spaced apart from the sensing element (118) by less than 5 mm.

31. The temperature sensor system (200) of claim 1, wherein the at least one sensing element (118) comprises a thermographic phosphor.

32. The temperature sensor system (200) of claim 31, wherein the at least one sensing element (118) comprises at least one phosphor selected from the group consisting of Manganese-doped phosphors, Europium-doped phosphors, Dysprosium-doped phosphors or Chromium-doped phosphors.

33. The temperature sensor system (200) of claim 31, wherein the at least one sensing element (118) comprises at least one phosphor selected from the group consisting of $La_2O_2S:Eu$, $Y_2O_3:Eu$, $LuPO_4:Eu$, $Mg_4FGeO_6:Mn$, $YVO_4:Dy$, $Y_2O_3:Dy$, $Y_3Al_5O_{12}:Dy$, $LuPO_4:Dy$, $YAG:Dy$, $GdAlOs:Cr$, $Al_2O_3:Cr$, $LaGaO_3:Cr$, $YAlO_3:Cr$ or any stoichiometries or combinations of the foregoing.

34. The temperature sensor system (200) of claim 1, wherein the at least one first optical excitation response signal (120) is characterized by an optical bandwidth having an upper wavelength and a lower wavelength.

35. The temperature sensor system (200) of claim 33, further comprising at least a first short-pass filter configured to have a cut-off wavelength within 10% of the upper wavelength of the optical bandwidth of the at least one optical excitation response signal (120).

36. The temperature sensor system (200) of claim 1, further comprising at least one second detector (208) configured to receive at least a portion of the at least one first combined signal (122).

37. The temperature sensor system (200) of claim 36, wherein the optical path (250) is configured to allow a first portion of the combined signal (122) to propagate to the at least one first detector (206) and to allow a second portion of the combined signal (122) to propagate to the at least one second detector (208).

38. The temperature sensor system (200) of claim 37, wherein at least a portion of the first portion of the combined signal (122) comprises the optical excitation response signal (120) and at least a portion of the second portion of the combined signal (122) comprises the optical-excitation-independent signal (124).

39. The temperature sensor system (200) of claim 37, wherein the at least one first detector (206) is configured to receive the optical excitation response signal (120) and the at least one second detector (208) is configured to receive the optical-excitation-independent signal (124).

40. The temperature sensor system (200) of claim 1, wherein the at least one first detector comprises at least one photodiode.

41. The temperature sensor system (200) of claim 1, wherein the at least one first detector comprises a monochromator.

42. The sensor system (200/300) of claim 1, wherein the at least one first detector comprises a Czerny-Turner monochromator.

43. A temperature sensor system (300), comprising:
- at least one light source (218) configured to emit at least one optical excitation signal (130);
- at least one temperature sensing device (100) including at least one sensing element (118) in thermal communication with at least one object to be measured, wherein the at least one sensing element (118) is configured to emit at least one optical excitation response signal (120) and the at least one temperature sensing device (100) is configured to emit at least one first combined signal (122) comprising at least a portion of the at least one optical excitation response signal (120) and at least one optical-excitation-independent signal (124);
- at least one optical analysis module (340) configured to receive at least a portion of the at least one first combined signal (122);
- at least one optical path (250) configured to allow the at least one optical excitation signal (130) to propagate to the at least one sensing element (118) and to allow at least a portion of the at least one first combined signal (122) to propagate from the at least one temperature sensing device (100) to the at least one optical analysis module (340); and
- at least one controller (378), wherein:
(i) the at least one optical analysis module (340) is configured to receive the at least one combined signal (122) from the at least one temperature sensing device (100), and to separate the at least one combined signal (122) into a plurality of discrete wavelength components (324) propagating to at least one measurement module (360) comprising a plurality of detectors (366), each of the plurality of detectors (366) corresponding to at least one of the plurality of discrete wavelength components (324) and configured to provide at least one signal representative of the each of the plurality of discrete wavelength components (324) to the at least one controller (378),
(ii) the at least one controller (378) is configured to separate the at least one signal representative of each of the plurality of discrete wavelength components (324) into at least one signal representative of the at least one optical excitation response signal (120) and at least one signal representative of the at least one optical-excitation-independent signal (124).

44. The temperature sensor system (300) of claim 43, wherein the at least one characteristic of the at least one optical excitation response signal (120) comprises an intensity decay rate of the at least one optical excitation response signal (120).

45. The temperature sensor system (300) of claim 43, wherein the at least one characteristic of the at least one optical excitation response signal (120) comprises an intensity of at least one wavelength of the at least one optical excitation response signal (120).

46. The temperature sensor system (300) of claim 43, wherein the at least one characteristic of the at least one optical-excitation-independent signal (124) comprises an intensity of black-body radiation.

47. The temperature sensor system (300) of claim 43, wherein the at least one characteristic of the at least one optical-excitation-independent signal (124) comprises an intensity of at least one wavelength of black-body radiation.

48. The temperature sensor system (300) of claim 43, wherein the at least one controller (378) is configured to calculate at least one object temperature based on at least one of the at least one characteristic of the at least one optical excitation response signal (120) and the at least one characteristic of the at least one optical-excitation-independent signal (124).

49. The temperature sensor system (300) of claim 1, wherein the at least one light source (218) comprises at least one of a light-emitting diode and a laser.

50. The temperature sensor system (300) of claim 49, wherein the at least one light source (218) emits radiation within a wavelength range of 375 nm to 800 nm.

51. A method of measuring an object temperature, comprising:
- providing at least one temperature sensing device (100) having at least one sensing element (118) in thermal communication with an object to be measured, the at least one sensing element (118) configured to emit at least one optical excitation response signal (120) and the at least one temperature sensing device (100) is configured to emit at least one combined signal (122) comprising at least one a portion of the at least one optical excitation response signal (120) and at least one optical-excitation-independent signal (124);
- providing at least one light source (218) configured to emit at least one optical excitation signal (130);
- providing at least one optical path (250) configured to allow the at least one optical excitation response signal (120) to propagate to the at least one sensing element (118);
- providing at least one detector (206) configured to receive the at least one optical excitation response signal (120) and the at least one combined signal (122) from the at least one temperature sensing device (100) and to provide at least one signal representative of the at least one combined signal (122) to at least one controller (228/378), wherein the at least one controller (228/378) is configured to separate the at least one signal representative of the at least one first combined signal (122) into at least one signal representative of the at least one optical excitation response signal (120) and at least one signal representative of the at least one optical-excitation-independent signal (124);
- in an excitation step (402), emitting and directing the at least one optical excitation signal (130) from the at least one light source (218);
- in a decay sampling step (404), sampling the at least one detector (206) during at least one decay sampling period, and storing data representative of the intensity decay rate associated with the at least one combined signal (122);
- in a system measurement step (406), measuring a temperature of the at least one detector (206) and calculating a parameter relating to the dark current of the detector (206),
- in a black-body radiation measurement step (408), sampling the at least one detector and storing data representative of the optical-excitation-independent signal (124);
- in a signal processing step, calculating at least one object temperature based on at least one of the at least one signal representative of the at least one optical excitation response signal (120) and the at least one signal representative of the at least one optical-excitation-independent signal (124).

52. The method of claim 51, further comprising:

subtracting the parameter relating to the dark current of the detector (206) from the parameter representative of the optical-excitation-independent signal (124) to product a dark-current-corrected black-body signal;

comparing the dark-current-corrected black-body signal to known data of the optical-excitation-independent signal (124);

calculating an object temperature associated with the optical-excitation-independent signal (124).

53. The method of claim 51, further comprising:

subtracting the dark-current-corrected black-body signal and the at least one optical-excitation-independent signal (124) from the at least one combined signal (122) to create data representative of the at least one optical excitation response signal (120);

calculating at least one time constant of the at least one optical excitation response signal (120) based on the intensity decay rate of the combined signal (122);

calculating an object temperature associated with the at least one time constant of the at least one optical excitation response signal (120).

\* \* \* \* \*